(12) United States Patent
Kestenbaum

(10) Patent No.: US 8,271,321 B1
(45) Date of Patent: Sep. 18, 2012

(54) APPARATUS AND METHOD FOR PROVIDING BUILDING MANAGEMENT INFORMATION

(75) Inventor: Gerald Isaac Kestenbaum, New York, NY (US)

(73) Assignee: Buildinglink.com, LLC, Long Island City, NY (US)

( * ) Notice: Subject to any disclaimer, the term of this patent is extended or adjusted under 35 U.S.C. 154(b) by 1568 days.

(21) Appl. No.: 09/587,525

(22) Filed: Jun. 5, 2000

(51) Int. Cl.
*G06Q 30/00* (2012.01)
*G06Q 10/00* (2012.01)

(52) U.S. Cl. ..................................... 705/14.1; 705/1.1

(58) Field of Classification Search ............. 705/1, 14.1, 705/1.1
See application file for complete search history.

(56) References Cited

U.S. PATENT DOCUMENTS

| 5,875,430 A * | 2/1999 | Koether ............................ 705/1 |
| 6,038,315 A * | 3/2000 | Strait et al. ..................... 713/183 |
| 6,334,107 B1 * | 12/2001 | Gale et al. ....................... 705/10 |

FOREIGN PATENT DOCUMENTS

| JP | 08097850 A * | 4/1996 |
| JP | 410229413 A * | 8/1998 |

OTHER PUBLICATIONS

Information on Yardi Systems, Inc.*
Information on Cawley International.*
Information on Yardi Systems, Inc. 1999-2002.*
Information on BJM Centralm printed on May 10, 1999.*
Information on IRIS, printed on May 10, 1999.*
Intranet for Apartmnet Dwellers, Jan. 30, 2000, Jerusalem Post.*
Translatoin of Aihara et al.*
Information on Yahoo.com, Nov. 28, 1996. Date is in URL in YYYYMMDD format.*
Information on Yahoo.com, 1996-2000, printed through www.archive.org. Date is in the URL in YYYYMMDD format p. 2 has reference date of Nov. 28, 1996.*
English Translation of Abe Japan Patent JP 08097850.*
English Translation of Aihara Japan Patent JP 410229413.*
Information on Yardi Systems, Inc., 1999-2002, archived webpages printed through www.archive.org.*
Information on Cawley International, 1999-2000, archived webpages printed through www.archive.org.*
English Translation of Aihara et al. Japan Patent JP 410229413, Aug. 1998, Translation done Feb. 17, 2005.*
Information on Yahoo.com, 1996-2000, printed through www.archive.org.*
English Translation of Abe Japan Patent JP 08097850, Apr. 1996, Translation done Mar. 2009.*
English Translation of Aihara et al. Japan Patent JP 410229413, Aug. 1998, Translation done Mar. 2009.*

* cited by examiner

*Primary Examiner* — Naresh Vig
(74) *Attorney, Agent, or Firm* — Finnegan, Henderson, Farabow, Garrett & Dunner, LLP

(57) ABSTRACT

An apparatus and a method for providing building management information, including a receiver for receiving at least one of information pertaining to at least one of a building, a property, a unit of the building, and a unit of the property, and a request to receive information, a memory device for storing at least one of the information and the request to receive information, a processor for processing at least one of the information and the request to receive information, wherein the processor generates a response to the at least one of the information and the request to receive information, and a transmitter for transmitting the response to a communication device associated with an individual authorized to receive the response. The at least one of the information, the request, and the response, contains at least one of building information, property information, unit information, management information and maintenance information.

41 Claims, 21 Drawing Sheets

APPARATUS AND METHOD FOR PROVIDING BUILDING MANAGEMENT INFORMATION

FIELD OF THE INVENTION

The present invention pertains to an apparatus and a method for providing building management information and, in particular, to an apparatus and a method for providing building management information and/or for providing building-related services.

BACKGROUND OF THE INVENTION

As the field of building and property management continues to grow, so does the need to more effectively and efficiently manage buildings and/or properties and maintenance information and activities. There are many shortcomings associated with current building and/or property maintenance and management activities.

Typically, building managers receive numerous requests for services and/or complaints from the various occupants and/or tenants of the respective buildings and/or properties. Managers may also have to disseminate information to occupants and/or tenants such as by holding public meetings and/or by distributing fliers and other communications. Managers may also, from time to time, obtain information from surveys and questionnaires. Managers must also receive and process maintenance information and/or requests via telephone calls and/or requests which may be left at a central location such as a front desk or other centralized information gathering location.

All of the above activities and related activities result in the need for building and property managers to receive, process, and/or disseminate, a great deal of information in order to effectively and efficiently manage and maintain buildings and/or properties.

The vast amount and variety of information, which can be received from many sources, can prove to be problematical for building or property managers and maintenance personnel to manage. Problems can routinely arise from the inability to obtain, record and store, the information in an organized manner and/or in a manner which can facilitate the effective and/or efficient handling of same and/or for responding thereto. Problems are routinely encountered when management or maintenance departments fail to follow-up on occupant or tenant requests, fail to keep records of same, and/or fail to respond to same. Failing to organize building management and/or maintenance information can also result in a lack of continuity in responding to the needs of occupants and/or tenants in a satisfactory manner.

In today's information and computer age, numerous software products and packages have been developed for assisting managers and maintenance departments in performing certain aspects of their duties. These products and packages, however, appear to be limited to specific and defined applications such as, for example, back office accounting and/or maintenance tracking applications.

Traditionally, software for building management has consisted primarily of accounting and back office applications. These packages have typically focused on the financial and legal aspects of managing properties, such as rent roles and escalations, lease renewals and expirations, and compliance requirements and notifications. Certain maintenance tracking programs have also been available in the marketplace which have either been provided as part of these programs or as stand-alone programs.

These programs have typically been designed and/or have been utilized for internal use as well as for hardwired networks between management and maintenance staff. These prior art technologies have typically been integrated with accounting systems for generating work orders and for approving bills, are usually difficult to operate and typically require the commitment to significant employee training.

The limitations of the prior art systems and technologies are significant, both in terms of the cost of the hardware, software and training, associated therewith as well as in the course of operating the associated system. Typically, all or most of the data entry and related operations must be performed by management staff.

The above-described prior art systems and technologies provide no benefits to residents of these properties or buildings and, further, provide no support for outside vendors or building management individuals and/or entities if these individuals and/or entities are not wired and/or linked into the system. The ultimate beneficiaries of the system, the tenants or residents, can neither enter data into the system nor receive any information from the system.

Various individual buildings or management companies have begun to implement communications systems for their buildings which are accessible over the Internet. Typically, the communications associated with these systems have taken the form of providing an e-mail address, or an e-mail form, on the company web site for submitting items such as a request for maintenance. The e-mail submissions associated with these prior art systems provide for only a minimal convenience over the traditional ways of submitting a maintenance request via phone or fax. These prior art systems also typically provide a one-way communication which terminates upon the message being sent and provide no subsequent benefit to either the tenant, the building manager, or the superintendent, once the message has been received.

In another area of building or property management, it is not uncommon for buildings or managing agents to create or operate web sites for posting certain documents which are typically accessible by respective users. However, these services are typically provided by professional web page designers or posting services which typically require that each document be selected and created specifically for each web posting. In this manner, the documents cannot be easily posted to, modified, and/or deleted from, a web site, especially by building management personnel who have no associated computer or web site training.

The herein-described prior art systems and technologies fail to provide an apparatus or method whereby a building manager can simply add, modify, delete, upload, and/or download, documents, notices, and/or messages, to a web site which is associated with a building or property. Further, the prior art systems and technologies typically fail to provide support for selecting target audiences (tenants, board members, maintenance personnel, front desk personnel, etc.) and, further, fail to provide for e-mail notification when new information may be disseminated from respective information sources which may be of interest to any of the individuals and/or entities which are associated with a building or property.

Prior art systems and technologies also fail to provide for the easy design and distribution of surveys to tenants or residents, and/or fail to provide an efficient platform for allowing building managers to post and collect results from surveys which could typically be provided to board members or other authorized building or property managers.

In view of the foregoing, there appears to be no product, apparatus, or method, for providing a comprehensive means by which to process building and/or property management data and/or information. There also appears to be no product, apparatus or method, for providing an effective interface between occupants and/or tenants and building or property management and/or maintenance departments.

SUMMARY OF THE INVENTION

The present invention pertains to an apparatus and a method for providing building management information and, in particular, to an apparatus and a method for providing building management information and/or building-related services. The present invention can be utilized to perform any number of services and/or functions regarding and/or related to building management, building maintenance, and/or other building or property related areas.

The apparatus and method of the present invention can be utilized to provide and/or to process information regarding any and/or all aspects of building or property management, maintenance, and/or to provide communication(s) among and/or between any and/or all of the various parties involved in, interested in, and/or who or which may have an interest in, any of the buildings, properties, and/or activities related thereto and/or described herein.

The apparatus of the present invention can include a central processing computer which can be any suitable computer or computer system, and/or any number of computers, computers systems, network computers, network computer systems, and/or server computers or server computer systems.

The apparatus can also include any number of user computers which can be utilized by, and/or which can be associated with, any of the herein-described users of the apparatus, which can include, but which is not limited to, any and/or all of the tenants, occupants, owners, workers, managers, outside vendors, building management personnel, building maintenance personnel, contractors, service providers, maintenance providers, building board members, police personnel, fire personnel, emergency services personnel, and/or any third parties. The apparatus can include any number of user computers each of which can be linked to the central processing computer.

The central processing computer and the user computer(s) can communication with each other, and/or be linked with each other, via any suitable communication network such as a telecommunication network, a telephone network, a public switched telephone network, the Internet and/or the World Wide Web, a local area network (LAN), a wide area network (WAN) and/or any other communication network, and/or any combination of communication networks. The communication network(s) can also include wireless networks and/or non-wireless and/or conventional line-connected networks.

The central processing computer can contain a database which can contain any and/or all of the data and/or information needed and/or desired for performing any of the functions described herein, including any and/or all data and/or information for managing communication(s) between the various individuals and/or entities described herein as well as any data and/or information for performing any of the processing functions and services described herein.

The apparatus and method of the present invention can be utilized in order to perform a wide variety of building management information processing and/or related services. In one embodiment, the apparatus and method of the present invention can be utilized by building occupants to provide important or timely information and/or instructions to a building's front desk or front gate personnel.

In another embodiment, the apparatus and method of the present invention can be utilized by authorized agencies, such as Police, Fire or emergency medical services, in order to obtain access to any of the herein-described information.

The apparatus and method of the present invention can also be utilized by building or property management in order to make information available, from an electronic library of documents, to occupants, building personnel, including front desk, front gate, or maintenance personnel, or outside vendors and/or agencies. The present invention can also be utilized in order to select, search for, obtain, maintain, and/or update, an existing document or documents.

The present invention can also be utilized to manage or to obtain updated information regarding requests for services. In another embodiment, the apparatus or the central processing computer can automatically provide new requests and/or requests which have yet to be serviced and/or processed to any respective or authorized individual or party. In another embodiment, the apparatus and method of the present invention can be utilized in order to provide customized pre-written responses for commonly encountered service requests.

In another embodiment, the building management or other building personnel can utilize the present invention in order to enter requests for other occupants who may not choose to use the system themselves.

The apparatus and method of the present invention can also be utilized so as to provide building management or maintenance personnel with the ability to view, analyze, or summarize, maintenance requests such as, but not limited to, viewing requests which may not have been responded to within a certain period of time, which may be flagged or identified as being urgent, which are of a certain nature or included in a certain category, and/or which can be assigned to specific building personnel or outside vendors. The present invention can also facilitate the viewing of any and/or all requests and charge-back amounts for a particular time period so that occupants can be billed for services provided to them and/or performed on their behalf. The present invention can provide any of the data and/or information described herein to any of the respective users of same.

In another embodiment, the apparatus and method of the present invention can be utilized to collect responses and information from occupants and/or users of the system so as to assist building or property management in their decision making processes.

The apparatus and method of the present invention can also be utilized by building occupants to distribute and/or to post notices, information, requests, or advertisements, to other occupants of the building, via an electronic bulletin board or other suitable medium.

The present invention can also be utilized in order to provide authorized users with various address and contact information for other building or property occupants and/or management personnel. The present invention can also be utilized in order to restrict access, to certain address and contact information, to the respective information regarding only those occupants and/or users who have indicated their desire and/or their permission to have this information made available to others.

The apparatus and method of the present invention can also be utilized in order to establish and/or to track the completion of a scheduled maintenance program, and/or for adding scheduled tasks from either or both of an expert system database or an external system database. The apparatus and/or the central processing computer can also facilitate the assignment and/or the delegation of tasks to in-house personnel and/or to outside contractors and/or agencies.

The apparatus and method of the present invention can also be utilized in order to record information, provide information tracking, and/or provide notification, regarding deliveries, shipments, and/or inbound package deliveries. If the particular building does not wish to record each delivery or shipment, the central processing computer can be programmed so as to monitor and/or to check any outstanding delivery or shipment, record information regarding same and designate same as being inactive upon the expiration of a specified time period. The present invention can also be utilized by individuals so as to arrange package pick-up and package shipment by a package delivery service.

In yet another embodiment, the apparatus and method of the present invention can be utilized in order to coordinate services and/or so as to provide information to operators and/or service providers who or which are, or may be, providing services to occupants of the building or property.

In still another embodiment, the present invention can be utilized in order to tabulate employee hours worked and/or so as to provide accounting-related services. In another embodiment, the central processing computer can also process and/or provide a list of employees, who are currently on duty. The present invention can also be utilized in order to schedule employee work times and/or to compare actual hours worked with budgeted and/or scheduled hours for a task or procedure. Data and/or information for a different work period can also be duplicated into another work period, thereby speeding up data entry for a given period. The present invention can also be utilized by a manager or authorized user in order to access and/or to view a comparison of days and hours scheduled versus actual days and hours worked for each employee.

In another embodiment, the present invention can be utilized in order to control access to buildings for occupants, employees of occupants, and/or visitors.

The apparatus and method of the present invention can also be utilized in order to provide information for multiple buildings and/or properties. The present invention can also be utilized in order to provide building and/or property management and/or maintenance information in a unified manner.

In another embodiment, the present invention can be utilized to provide aggregated and/or integrated data and/or information for multiple buildings or properties. The present invention can also receive any of the herein-described information and/or perform any of the herein-described functions for any one or more of the buildings or properties under management. The present invention can also provide information to owners, occupants, managers, vendors, and/or any other parties, regarding interests in multiple buildings and/or properties.

The apparatus and method of the present invention can be utilized in order to enable building or property owners or managers of multiple buildings or properties to create and maintain a master library of documents, information, maintenance requests and responses thereto, and/or any of the other herein-described information, for any number and/or types of buildings and/or properties. The master library can be accessed by individuals located at, and/or associated with, any of the building or properties under management.

The apparatus and method of the present invention can also be utilized in order to provide information for decision-making individuals associated with a building or property. The present invention can be utilized in order to circulate surveys to, and obtain survey responses from, certain individuals. The present invention can be utilized so as to provide for the distribution of specific information, lists, or reports, to certain users or individuals at any time and/or on a scheduled basis.

The central processing computer(s) and/or the user computer(s) can perform any of the respective processing functions described herein. Further, the central processing computer(s) and/or the user computer(s) can generate and transmit e-mail messages, pager messages, telephone messages, voice mail messages, facsimile messages or transmissions, and/or any other messages and/or types of messages, for providing any of the communication and/or notification functions described herein.

Accordingly, it is an object of the present invention to provide an apparatus and a method for providing building management information.

It is another object of the present invention to provide an apparatus and a method for providing building management information, in a network environment.

It is still another object of the present invention to provide an apparatus and a method for providing building management information and building-related services.

It is yet another object of the present invention to provide an apparatus and a method for providing building management information which can be utilized to provide and/or to process information regarding any and/or all aspects of building or property management.

It is another object of the present invention to provide an apparatus and a method for providing building management information which can be utilized to provide and/or to process information regarding any and/or all aspects of building or property maintenance.

It is still another object of the present invention to provide an apparatus and a method for providing building management information which can be utilized to provide communication(s) among and/or between any and/or all of the various parties involved in, and/or who or which may have an interest in, a building and/or property.

It is yet another object of the present invention to provide an apparatus and a method for providing building management information which can be utilized in conjunction with a centralized computer or computer system.

It is another object of the present invention to provide an apparatus and a method for providing building management information which can be utilized in conjunction with individual computers and/or communication devices.

It is yet another object of the present invention to provide an apparatus and a method for providing building management information which can be utilized in conjunction with any one or more of the Internet, the World Wide Web, a local area network, a wide area network, a telecommunication network, a telephone network, a public switched telephone network, and/or any other suitable communication network or system.

It is another object of the present invention to provide an apparatus and a method for providing building management information which can be utilized in conjunction with a wireless network and/or a non-wireless or line-connected network.

It is still another object of the present invention to provide an apparatus and a method for providing building management information which can be utilized by building occupants to provide important or timely information and/or instructions to a building's front desk or front gate personnel.

It is yet another object of the present invention to provide an apparatus and a method for providing building management information which can be utilized by authorized agencies and/or individuals to obtain access to emergency information.

It is another object of the present invention to provide an apparatus and a method for providing building management information which can provide information to any interested party.

It is still another object of the present invention to provide an apparatus and a method for providing building management information which can provide for any one or more of document and/or information searching, selection, accessing, maintenance, editing, and/or updating.

It is yet another object of the present invention to provide an apparatus and a method for providing building management information which can be utilized to manage information regarding requests for services.

It is another object of the present invention to provide an apparatus and a method for providing building management information which can be utilized to manage information updates regarding requests for services.

It is still another object of the present invention to provide an apparatus and a method for providing building management information which can automatically provide notification of new requests, and/or requests which have yet to be serviced and/or processed, to an authorized individual or party.

It is yet another object of the present invention to provide an apparatus and a method for providing building management information which can provide customized pre-written responses for commonly encountered service requests.

It is another object of the present invention to provide an apparatus and a method for providing building management information which can facilitate the entering of requests for information and/or for services on behalf of third parties.

It is still another object of the present invention to provide an apparatus and a method for providing building management information which provides for the viewing, analyzing, and/or the summarization, of building management information.

It is yet another object of the present invention to provide an apparatus and a method for providing building management information which provides for the viewing, analyzing, and/or the summarization, of building maintenance information and/or maintenance requests and/or the status of same.

It is another object of the present invention to provide an apparatus and a method for providing building management information which can be utilized to collect responses and/or information from occupants and/or users of the invention.

It is still another object of the present invention to provide an apparatus and a method for providing building management information which can also be utilized by building occupants to distribute and/or to post notices, information, requests, or advertisements, via an electronic bulletin board or other suitable medium.

It is yet another object of the present invention to provide an apparatus and a method for providing building management information which can provide address or contact information for building or property occupants and/or management.

It is another object of the present invention to provide an apparatus and a method for providing building management information which can provide for the safeguarding of, and/or for the restricted access to, certain building or property management information.

It is still another object of the present invention to provide an apparatus and a method for providing building management information which can be utilized to establish and/or to track a scheduled maintenance program, or the status of same, for a building or property.

It is yet another object of the present invention to provide an apparatus and a method for providing building management information which can facilitate the scheduling of tasks and/or the addition of tasks to a database and/or to an expert system database.

It is another object of the present invention to provide an apparatus and a method for providing building management information which can facilitate the assignment and/or the delegation of tasks to in-house personnel and/or to outside contractors and/or agencies.

It is still another object of the present invention to provide an apparatus and a method for providing building management information which can be utilized in order to record information, track information, and/or provide notification, regarding deliveries or shipments.

It is yet another object of the present invention to provide an apparatus and a method for providing building management information which can be programmed to monitor and/or to check outstanding delivery or shipment records.

It is another object of the present invention to provide an apparatus and a method for providing building management information which can be utilized to arrange package pick-up or delivery services.

It is still another object of the present invention to provide an apparatus and a method for providing building management information which can be utilized to coordinate services and/or to provide information to service providers.

It is yet another object of the present invention to provide an apparatus and a method for providing building management information which can be utilized to tabulate employee hours worked and/or to provide related accounting services.

It is another object of the present invention to provide an apparatus and a method for providing building management information which can provide a listing of employees currently on duty.

It is still another object of the present invention to provide an apparatus and a method for providing building management information which can be utilized to schedule employee work times.

It is yet another object of the present invention to provide an apparatus and a method for providing building management information which can provide for the comparison of actual hours worked by management and/or service workers against budgeted and/or scheduled hours for a task or procedure.

It is another object of the present invention to provide an apparatus and a method for providing building management information which can provide for a comparison of days and hours scheduled versus actual days and hours worked for each employee.

It is still another object of the present invention to provide an apparatus and a method for providing building management information which can be utilized in order to control individual access to buildings or properties.

It is yet another object of the present invention to provide an apparatus and a method for providing building management information which can provide building or property information for multiple buildings and/or properties.

It is yet another object of the present invention to provide an apparatus and a method for providing building management information which can provide building or property information for multiple buildings and/or properties in a unified manner.

It is another object of the present invention to provide an apparatus and a method for providing building management information which can provide aggregated and/or integrated data and/or information for buildings or properties under management.

It is still another object of the present invention to provide an apparatus and a method for providing building management information which can be utilized in order to circulate surveys and/or to obtain survey responses.

It is yet another object of the present invention to provide an apparatus and a method for providing building management information which can provide for the distribution of information, lists, and/or reports, to certain users or individuals.

It is yet another object of the present invention to provide an apparatus and a method for providing building management information which can provide for the distribution of information, lists, and/or reports, to certain users or individuals on a scheduled basis.

It is another object of the present invention to provide an apparatus and a method for providing building management information which can be utilized to create and/or to maintain a master library of documents, information, and/or stored maintenance request responses, which can be utilized by any number and/or types of buildings and/or properties and/or the respective managers of same.

It is still another object of the present invention to provide an apparatus and a method for providing building management information which can generate and/or transmit e-mail messages, pager messages, telephone messages, voice mail messages, facsimile messages or transmissions, and/or any other messages and/or types of messages, for providing information to a respective individual or party.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENT

The present invention pertains to an apparatus and a method for providing building management information and, in particular, to an apparatus and a method for providing building management information and/or building-related services. The present invention can be utilized to perform any number of services and/or functions regarding and/or related to building or property management, building or property maintenance, and/or building or property related areas.

As defined herein, the terms "building", "property", or the plurals thereof, refer to any buildings, properties, apartment buildings, condominiums, townhouses, residential buildings, commercial buildings, commercial facilities, residential and commercial buildings, and/or any other building, property, or structure, for which management and/or maintenance activities or services may be performed.

As defined herein the terms "individual", "user", or their plurals, refer to any of the individuals, users, entities, tenants, owners, unit owners, occupants, managers, employees, maintenance employees, maintenance workers, contractors, building or property board of director members, police personnel, fire personnel, emergency services personnel, and/or any other individual, user, or entity, who or which may utilize the apparatus and method of the present invention, as described herein and/or otherwise.

The apparatus and method of the present invention can be utilized in order to provide and/or to process information regarding any and/or all aspects of building or property management, maintenance, and/or to provide communication(s) among and/or between any and/or all of the various parties involved in, interested in, and/or who or which may have an interest in, any of the buildings, properties, and/or activities related thereto and/or described herein.

Figure 1:
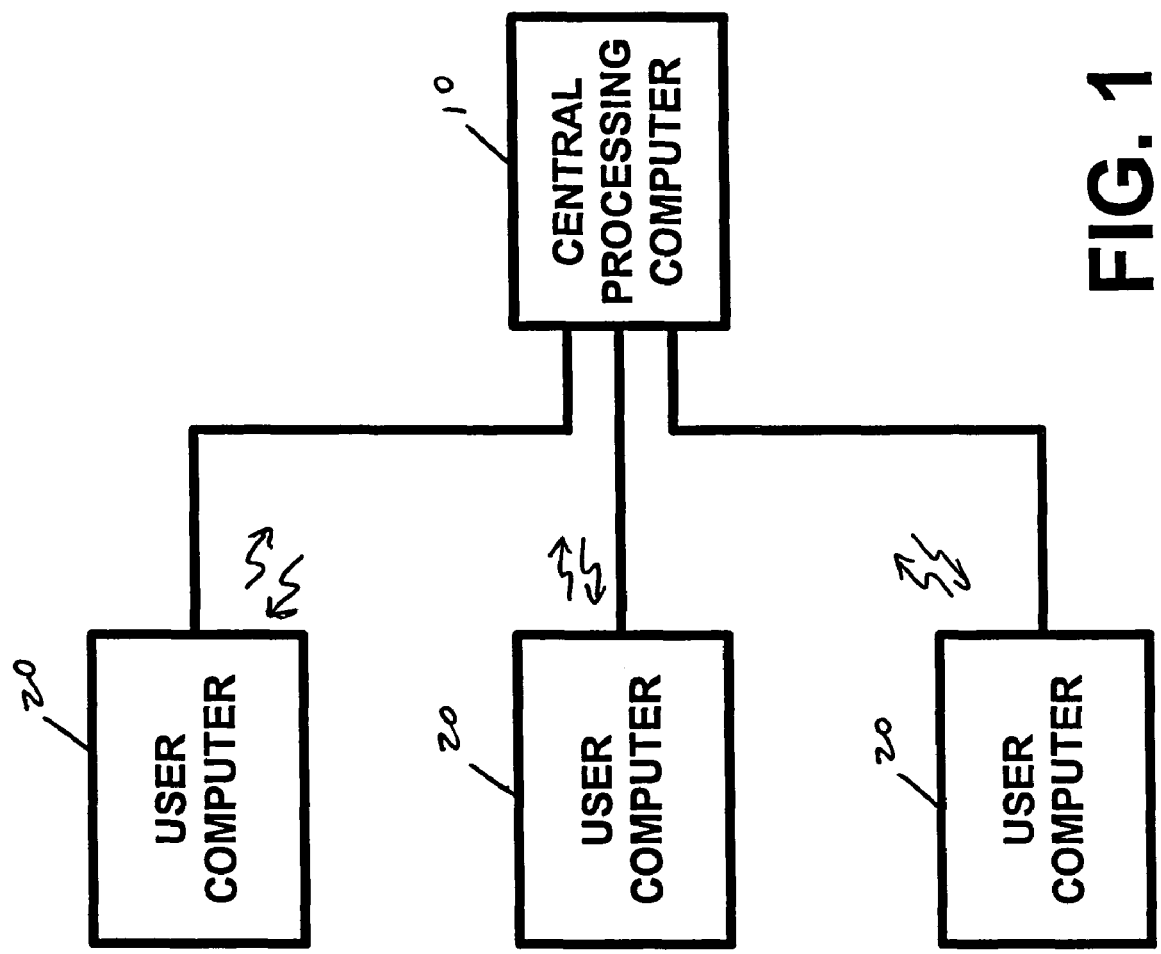
FIG. 1 illustrates a preferred embodiment of the apparatus of the present invention, in block diagram form.

FIG. 1 illustrates a preferred embodiment of the apparatus of the present invention, which is designated generally by the reference numeral 1, in block diagram form. With reference to FIG. 1, the apparatus 1 includes a central processing computer 10 which can be any suitable computer or computer system, and/or any number of computers, computers systems, network computers, network computer systems, and/or server computers or server computer systems.

The apparatus 1 also includes at least one or more user computers 20 which can be utilized by, and/or which can be associated with, any of the herein-described users of the apparatus 1 and which can include, but which is not limited to, any and/or all of the tenants, occupants, owners, workers, managers, outside vendors, building management personnel, building maintenance personnel, contractors, service providers, maintenance providers, building board members, police personnel, fire personnel, emergency services personnel, and/or any third parties. The apparatus 1 can include any number of user computers 20.

The central processing computer 10 and the user computer(s) 20 can communication with each, and/or can be linked with each other, via any suitable communication network, such as a telecommunication network, a telephone network, a public switched telephone network, the Internet and/or the World Wide Web, a local area network (LAN), a wide area network (WAN), and/or any other communication network, and/or any combination of communication networks. The communication network can also include wireless networks and/or non-wireless and/or conventional line-connected networks.

Each of the central processing computer(s) 10 and the user computer(s) 20 can be general purpose computers which can be utilized in the embodiments and/or applications described herein and which can include respective central processing units (CPUs), random access memory (RAM) devices, read only memory (ROM) devices, input devices such as, for example, keyboards, mouses, scanners, output devices such as, for example display devices, printers, facsimile machines, transmitters, receivers, and/or transceivers and/or modems, for facilitating communication in a network environment, and databases for storing the respective data and/or information which is processed by the respective computer(s).

In the preferred embodiment, each of the central processing computer(s) 10 and the user computer(s) 20 can be equipped with any other suitable hardware and/or software for performing their respective functions as described herein.

The database of the central processing computer 10 contains any and/or all of the data and/or information needed and/or desired for performing any of the functions described herein, including any and/or all data and/or information for managing communication(s) between the various individuals and/or entities described herein as utilizing the apparatus 1. The database of the central processing computer 10 can also contain data and/or information regarding any of the herein-described individuals and/or entities who or which utilize the present invention as well as any data and/or information for, or regarding, any of the buildings, including multi-unit buildings or groups of buildings, and/or property or properties, which are managed and/or maintained via the apparatus 1 of the present invention.

The above-described multi-unit buildings could include, but not be limited to, residential high-rise buildings, apartment buildings, commercial high-rise office buildings, apartment buildings, condominium complexes, townhouse or garden apartment complexes, gated residential communities, office parks, industrial parks, and/or any other buildings or properties, residential and/or commercial. Groups of buildings can include geographically separate units or buildings which share a common ownership or management entity or management structure.

The database of the central processing computer 10 can be maintained and/or can be utilized on, or in conjunction with, any computer and/or computer system and can be maintained at a single location and/or at multiple locations. Access to the central processing computer 10, and to the database of same and/or a database utilized in conjunction therewith, can be accomplished via the communication network(s).

The database of the central processing computer 10 can also contain any data and/or information which an occupant, resident, tenant, owner, and/or commercial tenant, of a unit or an apartment, office, and/or home, would desire or would permit to make available, to any of the building personnel, managers, other building occupants, or outside agencies or vendors, described herein or otherwise, for the purpose of providing any of the herein-described services and/or for improving building and/or related services and/or communications. Such data and/or information can include, but not be limited to, general contact information such as name, address, phone number, fax number, e-mail address, pager number, emergency contact information, special instructions in the event of a medical, fire or police emergency, permanent and/or temporary front desk instructions, emergency access and/or security information and/or alarm information, and/or entry permission instructions or information so that, for example, security cardholders may be able to gain entry into the respective building and/or unit.

The database of the central processing computer 10 can also contain data and/or information which can be useful to outside vendors and/or to affiliated operators, and/or which can be useful in the provision of affiliated operations, which may provide or render services to occupants, tenants, owners, or other individuals or entities, such as parking garage instructions or newspaper delivery instructions. The database also can contain data and/or information regarding maintenance or service requests made by an occupant, tenant, owner, or other individual or entity. The database can also contain bulletin board and/or other notices which can be posted by an occupant, tenant, owner, or other individual or entity.

The database of the central processing computer 10 can also contain data and/or information, and/or related or corresponding data and/or information fields, which can facilitate a wide range of notification capabilities and/or options for the respective occupant, tenant, or other individual and/or entity, including any one or more of whether, and the manner in which, the occupants, tenants, owners, or other individuals and/or entities (hereinafter collectively referred to as "occupant" or "occupants") desire to be notified in the event of an emergency, in the event that certain confidential information in the occupant's record is, or has been, accessed, in the event that a new item is added to a library database, in the event that a new survey question has been posted, in the event that an action is added to the maintenance request database, in the event that a package is delivered for the occupant, and/or to provide any other type of event notification and/or announcement information.

The database of the central processing computer 10 can also contain data and/or information regarding an occupant's and/or any other user's preferences regarding whether the occupant or user wishes to make his, her, or its, address and contact information available and/or available for viewing and/or for accessing by others, in a building address book, or whether the occupant or user wishes to receive notices and/or solicitations from other users of the apparatus 1 of the present invention. Preferences for a wide variety of services and in a wide variety of subject areas can be stored in the database.

The database of the central processing computer 10 can also contain data and/or information which can be provided by a managing agent or building owner, which is, or which can be, of interest or of value to building occupants and/or employees. This data and/or information can include management contact information, library-type documents, URL links, electronic files of any and/or all sorts, which can be downloaded to a respective computer or device, including, but not limited to, graphic files, text files, word processing documents, etc., in a variety of formats, maintenance requests which are made by building management personnel or entities, employee work schedule information, outside vendor information regarding and/or for vendors who or which provide services or products to the building management or its occupants, and/or survey questions and responses thereto.

The database of the central processing computer 10 can also contain various information, fields, categories and/or operating parameters, which control how the apparatus of the present invention and/or any of the embodiments described herein can operate and/or appear. These types of information can include a customized list or listing of categories for maintenance requests, a customized list of categories for library document types, customized fields that have unique descriptions and purposes for each property, building, or group of units, and operating parameter data, information, and/or fields, to activate or deactivate specific features and/or software and/or operational modules of and for any of the applications or embodiments of the present invention described herein, including library applications, front desk applications, maintenance applications, address book applications, survey question applications, parking applications, maintenance expert system and scheduling applications, bulletin board applications, requests for questions (RFQ), entry access control applications and employee work scheduling module applications.

The database of the central processing computer 10 can also include data, information, and/or field(s), for identifying the type of property, building, or group of units, each building or property, such as, for example, residential, commercial, gated community, which field or fields and/or value(s) associated therewith can or may control how various operations and/or options can work and/or the information which can be displayed or provided to users of the present invention (i.e. Apartment No., Office No., Street Address, etc.).

The database of the central processing computer 10 can also include data and/or information which is or which can be entered by the building personnel in the course of operating the building, and/or data and/or information which can include progress notes on maintenance requests, employee start-work and end-work times, and/or any recording of package deliveries or shipments.

The database of the central processing computer 10 can also include user information and/or passwords for correctly identifying a specific user as authorized individual who can access the apparatus 1, and/or for identifying the user or the type of user or individual accessing the system, including whether the user is an occupant, front desk personnel, other building personnel, maintenance department employee, building manager, owner, or outside agency or company, including contractors and services providers, newspaper delivery companies, and emergency agencies, such as, for example, police, fire and medical emergency response units. If the user accessing the system is an occupant, the database can contain information identifying that particular occupant as being associated with a specific unit, office, or apartment, and all users are identified as being associated with their respective building.

The database of the central processing computer 10 can also include data and/or information for providing or for facilitating an "Expert" system component which can contain general information on recommended types and frequencies of maintenance tasks for various equipment, and/or for various situations, which may be found in, and/or which may arise or occur in, respectively, any of the properties, buildings, and/or units, and which can typically be performed by either building personnel or outside vendors on behalf of the building management or owner. These tasks can include general building maintenance tasks such as, but not limited to, cleaning, garbage disposal, garbage removal, equipment inspections, etc., and may also include tasks of a more specialized nature such as, but not limited to, maintenance tasks or procedures for heating systems, cooling systems, water circulating systems, elevators or elevator systems, fire extinguishers, and/or any other mechanical and/or electrical system(s), as well as any other maintenance task which may need to be performed periodically and/or otherwise.

The database of the central processing computer 10 can also contain general task descriptions along with recommended maintenance or service procedures and their frequencies, and/or specific task descriptions, which can be provided by a specific equipment manufacturer or servicing entity. The above-described "Expert" system can also contain or include data and/or information regarding and/or related to non-maintenance tasks which building management and/or its selected agents, vendors, or consultants, may want to perform or have performed on an interval basis, such as, for example, issuing annual window-guard notices or reviewing insurance policies. Each of these tasks could also have recommended review frequency data and/or information, review dates, etc., associated therewith which can also be stored in the database of the central processing computer 10.

The database of the central processing computer 10 can also contain data and/or information regarding maintenance tasks, including scheduled tasks and/or procedures as well as specific and/or customized information for each specific property, building, or unit, which is serviced by the apparatus 1. This data and/or information can include data and/or information regarding maintenance and/or other tasks which may need to be performed on a periodic basis and/or otherwise and which may be needed for the specific property, building, and/or unit. This data and/or information can also include data and/or information regarding the status of maintenance tasks and comment logs containing comments and/or notes such as, but not limited to, whether a task is open, closed, on-hold, the priority status of same, charge-back information regarding a task, and/or costs associated with, or charges for, a task.

Information regarding the above-described tasks can be extracted and/or processed directly from the "Expert" system component based on the specific equipment, and/or any needs and/or procedures associated therewith, which can be associated with the specific property, building, or unit, or which could be taken from the "Expert" system and be further customized, modified, and/or changed, so as to match the needs or requirements of the property, building, or unit. Any of the above-described data and/or information can also be newly entered directly into the database and/or can be initially stored therein. Data and/or information regarding each of the herein-described tasks can also have associated therewith specific data and/or information regarding, or related to, service intervals or service frequencies pertaining to the task and/or when these services should be performed. The data and/or information can also designate the party or individual who or which is responsible for the performing or completing the task.

The database of the central processing computer 10 can also contain data and/or information regarding and/or related to planned work schedules for some or all of a respective building's employees, including work schedules, times (i.e. days and hours) when they are expected to be on-duty, as well as pay rates and overtime rates. The database of the central processing computer 10 can also contain information regarding actual days and hours worked for some or all of a building's employees.

The database of the central processing computer 10 can also contain information regarding outside vendors who or which can provide services to building occupants. In addition to basic contact information for each vendor, the database can also include the category or type of service(s) provided (i.e. electrical, plumbing, carpentry, insurance, package delivery, etc.), as well as user satisfaction data, including the number of reviews which have been received for a service provider and/or information regarding the favorableness or unfavorableness of same.

The apparatus 1 and method of the present invention can be utilized to perform a wide variety of building management information and/or building or property related services.

Figure 2:
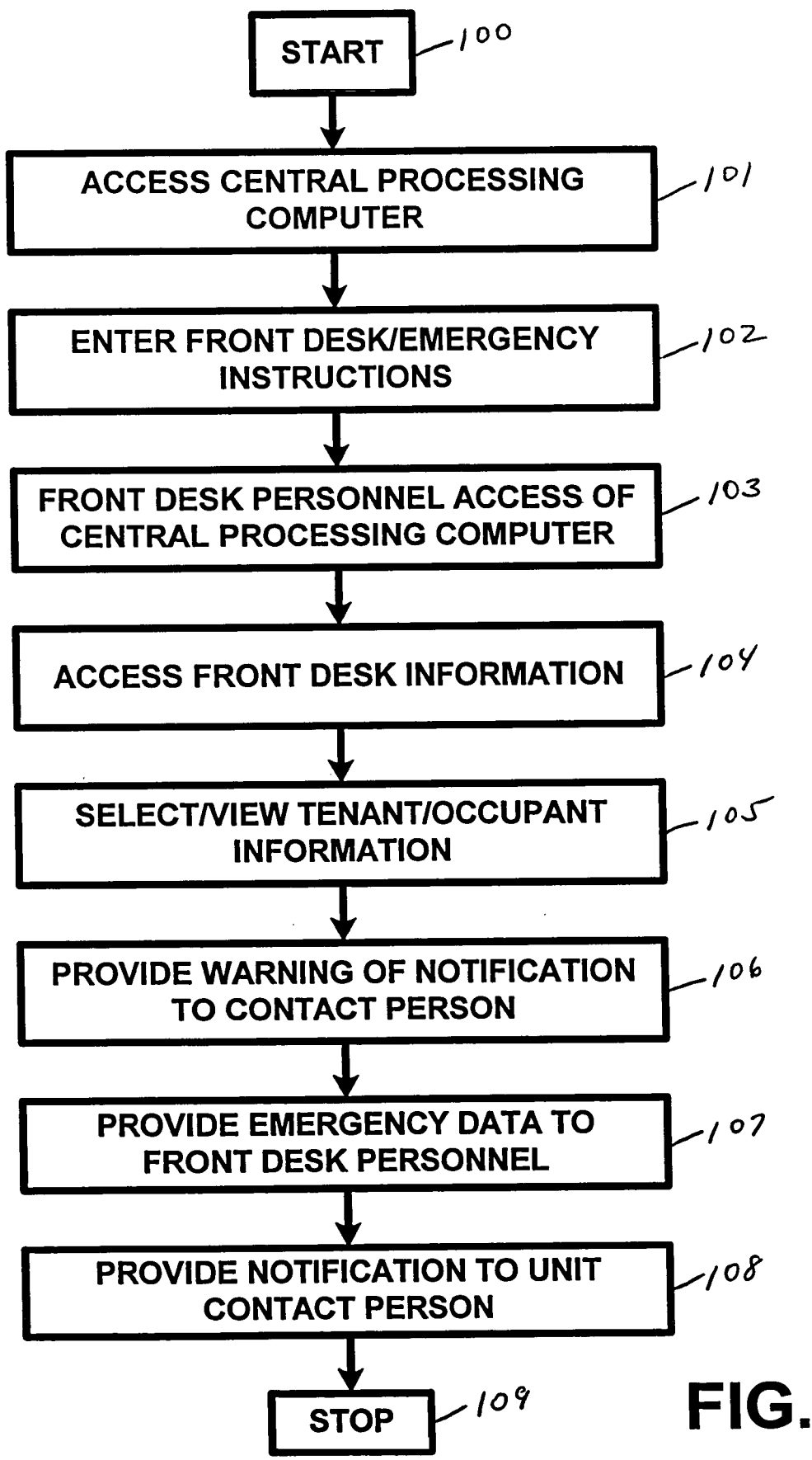
FIG. 2 illustrates a flow diagram of a preferred embodiment method for utilizing the present invention.

In a first preferred embodiment, the apparatus and method of the present invention can be utilized by building occupants to provide important or timely information and/or instructions to a building's front desk or front gate personnel. FIG. 2 illustrates a flow diagram of a preferred embodiment method for utilizing the present invention. The operation of the apparatus 1 commences at step 100. At step 101, the tenant accesses the central processing computer 10 with the user computer 20. At step 102, the tenant can enter or input front desk instructions and emergency instructions into the central processing computer 10 which, in turn, will process and store these instructions.

At step 103, the front desk personnel can access the central processing computer 10, such as via the Internet, the World Wide Web, a local area network, a wide area network, and/or via a computer, a web server, a wireless communication device, and/or a central processing computer, and retrieve the instructions therefrom such as by accessing the tenant's file and/or a file associated with the tenant or with the tenant's unit number. The front desk personnel can access the instructions by either entering the unit number, or the tenant's or occupant's name, or by performing a search of all tenants and/or occupants by matching a search term or terms, and/or by selecting the desired unit from a list of matches.

At step 104, the front desk personnel can access the front desk information and any contact information from the database of the central processing computer 10. This information can include instructions for workmen, permissions to give access to the unit, apartment, or office, special instructions regarding where or when to contact the tenant or occupant while on vacation, or any information which the tenant or occupant may want to share with the front desk staff.

At step 105, the front desk personnel or managing agent can select to access and/or view the tenant's or the occupant's emergency information. At step 106, the front desk personnel and/or other user seeking to access the emergency data regarding the unit can be warned that the unit contact person will be notified of the fact that their emergency data is being, or has been, accessed. The user can then select to continue to proceed to access and/or view the data. At step 107, the emergency data can be provided to the front desk personnel, including emergency medical, fire and police instructions, emergency access information, key-holding and/or alarm information, and/or emergency contact information.

At step 108, the unit contact person can be notified of the time and the name of the person accessing any of the emergency data and/or other herein-described data or instructions. The notification can be performed via e-mail message, facsimile transmission, pager or beeper message, or via any other conventional notification or communication method or means, including wireless communication methods and/or means and/or wired communication methods and/or means. Thereafter, the operation of the apparatus 1 will cease at step 109.

In another preferred embodiment, the apparatus 1 and method of the present invention can be utilized by authorized agencies, such as Police, Fire, or emergency medical services, to obtain access to any of the herein-described emergency information. In addition to accessing emergency information for a single unit via steps 104 to 108, after logging on with an authorized user name and password, these agencies can request to see all emergency information or selected emergency information (i.e. medical or fire only), for the entire building or for a single floor, or a range of floors. This can provide important information to emergency response personnel who can have access to this information before arriving on the scene.

Figure 3:
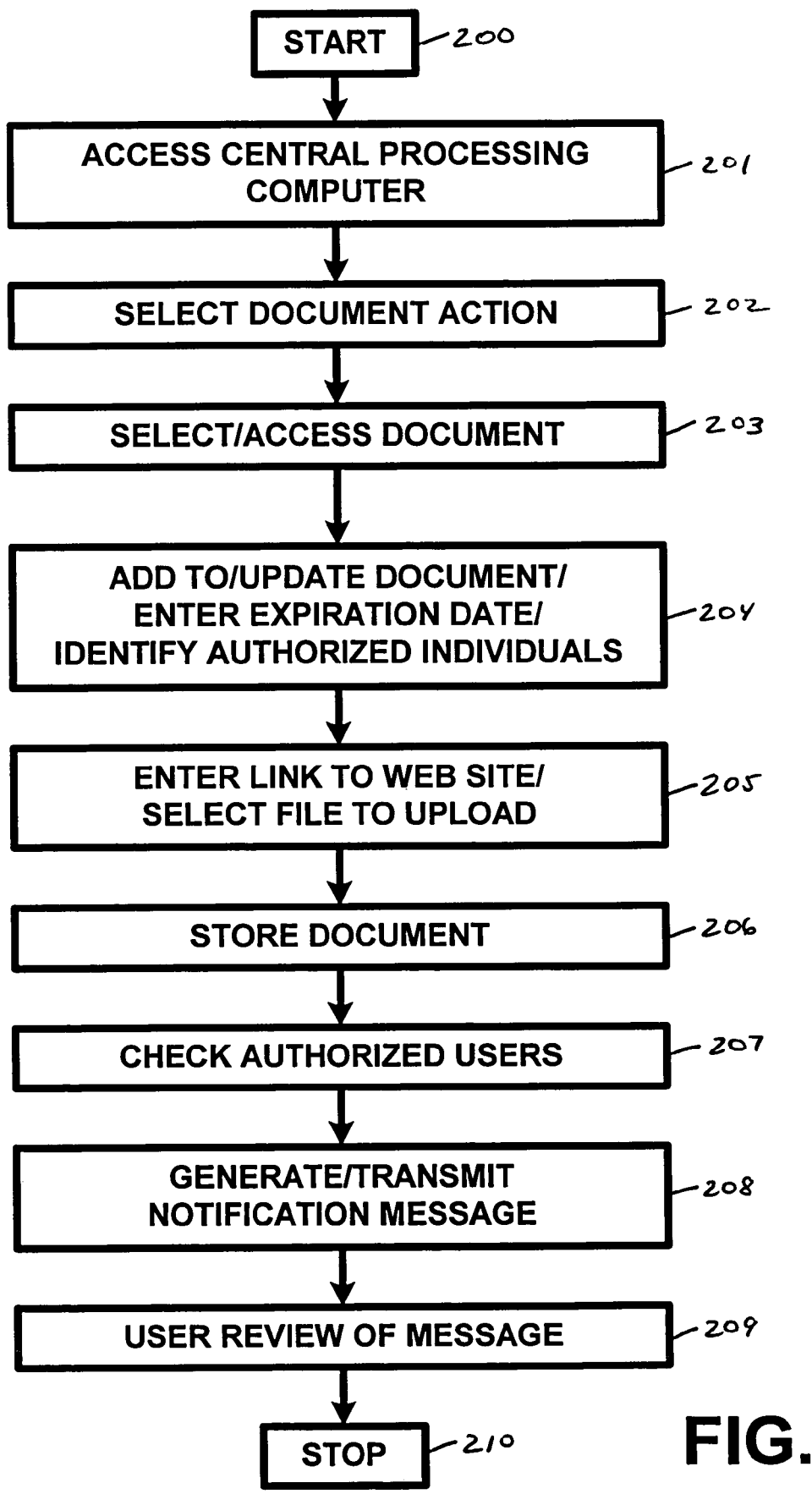
FIG. 3 illustrates a flow diagram of another preferred embodiment method for utilizing the present invention.

In another preferred embodiment, the apparatus 1 and method of the present invention can be utilized by building or property management personnel in order to provide information from an electronic library of documents, to occupants, building personnel, including front desk or front gate or maintenance personnel, or outside vendors and/or agencies. FIG. 3 illustrates a flow diagram of an another preferred embodiment method for utilizing the present invention. The operation of the apparatus 1 commences at step 200. At step 201, a building management individual accesses the central processing computer 10 with the user computer 20.

At step 202, the building management individual can select whether to add a new document or add to, edit, or update, an existing document. If the individual desires to add to an existing document, at step 203, the individual can select the document category and/or title and access the document. At step 204, the individual can add text to, and/or update, the document. At step 204, the individual can further enter an expiration date for the document and can identify the users, individuals, and/or types of users and/or individuals who are authorized to access, view, and/or update, the document (i.e. occupants, front desk personnel, maintenance personnel, board member(s), and/or any other authorized individual). The individual can, in the alternative, at step 202, identify the document as being a new document, such as being shown in a "What's New" information section, create the document, and/or specify a date or dates related to document posting, effectiveness, and/or expiration, etc. At step 205, the individual can enter a related URL link to a web site. The individual can also select to upload a graphics file or other document file which can be attached to the document.

If desired, at step 205, the individual can be prompted to browse for, and identify, the file to be uploaded, and the upload can thereafter be effected into the database of the central processing computer 10. At step 206, the central processing computer 10 can complete the storing of the document. At step 207, the central processing computer 10 can perform a check regarding all users or individuals who are, or who may be authorized to access and/or to view the document. The central processing computer 10 can also perform a check regarding whether any of the users or individuals have requested to receive notification of new additions to the library as well as updates to an existing document. Once identified, the central processing computer 10 can, at step 208, generate and transmit an appropriate notification message(s) to the users or individuals, such as transmitting an e-mail message, a fax transmission, and/or effect any other method or means for performing a communication, including a wireless and/or a wired communication.

If the individual selects to maintain or update an existing document, a search for the document can be performed, and the user can select from a list of all matching documents, or a list of all documents in the library, by selecting the desired document. Thereafter, the requested document can be displayed for editing at which time any and/or all of the fields described above can be modified or edited. In addition, the entire document can be deleted, or the expiration date can be set to a past date, at which point the document will no longer be viewable by any other user or individual. At all times, the building management personnel and/or individual can reserve the option to access and/or display expired or outdated documents and/or to re-activate any expired or outdated document(s) by changing the expiration date to a future date.

In the preferred embodiment, the document library can be accessed by any authorized user or individual by selecting or by "clicking" on the selected Library icon or link, and/or by selecting the link which can be embedded in an e-mail message which serves to notify the user or individual that a new document has been added to the database. The document library can also be accessed from each user's or individual's initial home page on the central processing computer 10, which home page can display all document titles as well as documents which may be identified as "New". If a specific document was not initially selected, the user or individual can be presented with a list of document categories and with the number of documents in each category.

At any time, the user or individual can select to view all documents in the library, and/or all documents in a specific category. The user or individual can also search the document library by using specific keywords. In any of the embodiments described herein, if a search is requested, a search screen can be presented to the user or individual thereby facilitating the entry of search criteria which can include title or document keywords, document category, or the date the document was posted.

The documents which are selected can be shown in summary form or in title form. If the user selects a specific document, that document can be displayed, along with all of its data fields, such as title, category, posting date, URL links, and any attached file(s). If a specific document was selected, the central processing computer 10 can immediately provide or display the specific document to the user or individual. If the user or individual selects to download any attached file, the central processing computer 10 can prompt the user or individual to identify the location to which to download the file and/or for any name to be assigned thereto. Thereafter, the central processing computer 10 can perform any download(s). If the user or individual selects or "clicks" on a URL link, the central processing computer 10 can direct the user or individual to the desired destination. At step 209, the user or individual can review any and/or all of the documents or messages transmitted to him, her or it. The operation of the apparatus 1 can thereafter cease at step 210.

Figure 4A:
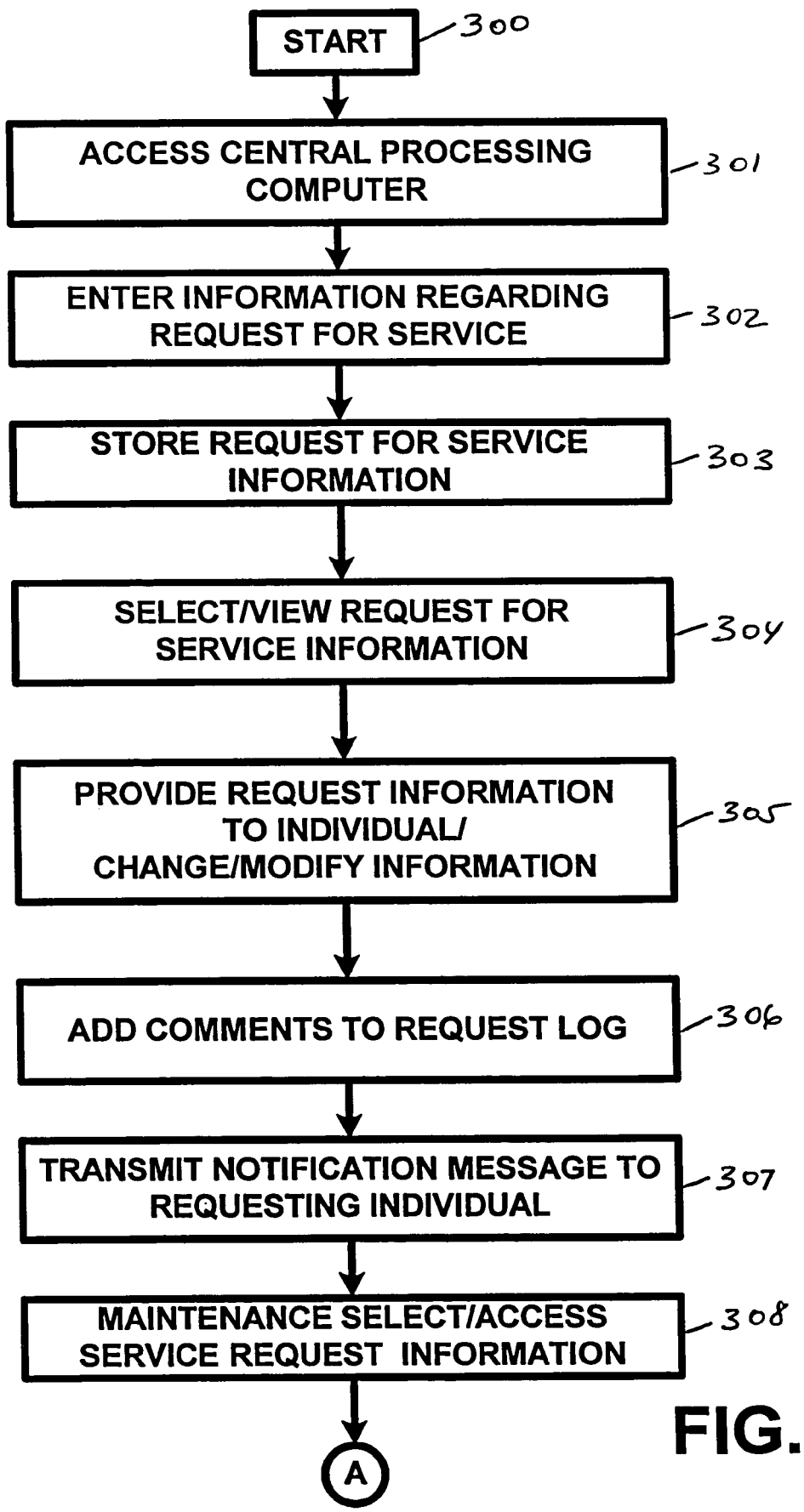
FIGS. 4A and 4B illustrate a flow diagram of another preferred embodiment method for utilizing the present invention.
Figure 4B:
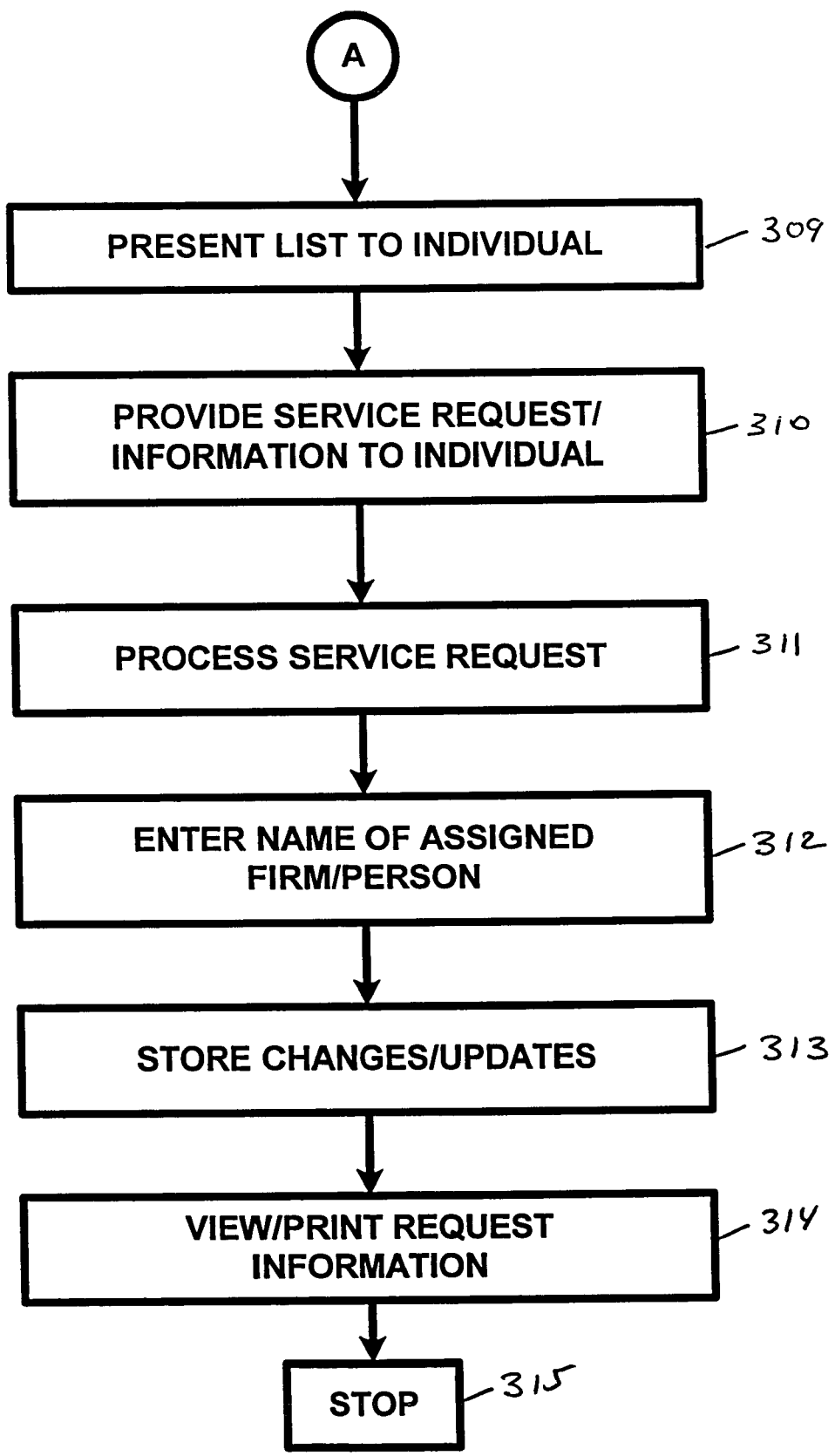

In another preferred embodiment, the present invention can be utilized to manage and/or to obtain updated information regarding requests for services. FIGS. 4A and 4B illustrate a flow diagram of an another preferred embodiment method for utilizing the present invention. The operation of the apparatus 1 commences at step 300. At step 301, the user, individual, occupant, or any building personnel (hereinafter "user"), accesses the central processing computer 10 in order to enter a new service request.

At step 302, the user can enter information regarding a request for a service. The request can include a title, a category selected from a list, a request description and an urgency rating. In addition, the user can also enter the e-mail or other contact information and/or instructions for any additional parties who or which the requester wishes to have kept informed about changes to the respective request.

Any and/or all data and/or information, utilized and/or processed in this preferred embodiment, can also be stored in a maintenance task database which can be stored in a portion of the database of the central processing computer 10.

At step 303, the request data can be stored in the database of the central processing computer 10. At step 304, the user requesting the service, and/or the individual or building personnel handling the service, can select to access and/or to view any open requests from information and/or links on the home page or web page of the central processing computer 10 and/or can select to access and/or to view any and/or all service or maintenance requests, whether open or closed, by selecting and/or by "clicking" on a respective icon, such as, for example, a maintenance icon or link.

At step 305, the individual seeking information regarding any requests can be provided with information, notes, and/or descriptions, of any actions taken regarding same, for any of the requests for service posted with the apparatus 1 and/or the central processing computer 10. At step 305, the individual or user seeking the service request information can change, modify, and/or update, any request for service and/or information pertaining thereto. The individual or user can also, at step 305, close out the request, cancel the request, and/or delete the request and/or otherwise alter or modify its status.

At step 306, the individual or user can add a comment(s) to a request log or other log or record which is or which may be related to the request(s). Any changes and/or updates made by, or entered by, the individual or user, during steps 305 and 306 can be stored in the database of the central processing computer 10. At step 307, a notification message is transmitted and/or otherwise sent to the individual or user who made the request for service, and/or to any service personnel, building personnel, and/or any other authorized and/or interested party, designated and/or desiring to be so notified, via an e-mail message, beeper or pager message, fax transmission, and/or via any other means, thereby providing notification to the respective party regarding the request and/or any other information regarding same.

At step 308, a maintenance and/or other personnel can select to access, view, and/or otherwise work with, the service requests, or information related thereto, which are stored and/or processed by the apparatus 1 in this embodiment. In another preferred embodiment, the apparatus 1 or the central processing computer 10 can automatically provide notification of new requests and/or requests which have yet to be serviced and/or processed to any respective or authorized individual or party.

The respective individual or user can select a request(s) to view based upon a variety of variables including unit number, request type, request status, and/or any urgency status or priority associated with a request. The individual or user can also select to have a list of matching requests sorted in a variety of ways, including sorting by unit number, request category, date opened, and/or priority or status. At step 309, a list of matching requests can be presented to the individual or user. The individual or user can then request to obtain more information regarding a request for service. At step 310, the selected service request and/or any information regarding same can be provided to the individual or user.

At step 311, the building or property management or maintenance department personnel can process and/or work with the service request in a variety of ways, including changing the request category, assigning a priority to the request, opening or closing a request, placing the request on hold until a certain date, closing the request, recording the amount of time spent on a task related to the request, entering a dollar amount of costs which can be charged to the service requesting individual, and/or posting a comment to the request log. At step 312, the name of the firm or person assigned to complete the task can be entered into the database. This information can include building personnel already listed in the central processing computer database, or outside vendors who have already been added to or are to be added to the database. At step 313, any changes or updates can be stored in the database. Thereafter, a notification message(s) regarding any of the above information can be transmitted to a respective individual(s) or party.

At step 314, the building or property management or maintenance department personnel can select to view and/or to print information regarding any open requests. This information can be formatted and/or provided for assignment of work tasks to different building personnel. In the event that specific requests may have been assigned to an outside vendor, that vendor can receive notifications for or regarding any and/or all activities and/or notification messages which are or which have been sent out. The vendor or vendors can also access the apparatus 1 and/or the central processing computer 10 in order to access information regarding service requests and/or tasks which have been assigned to them in the same manner in which a building or property management and/or maintenance department personnel can obtain information regarding any of the herein-described service requests which are posted with the central processing computer 10 and/or the apparatus 1.

In another preferred embodiment, the above-described method can include providing customized pre-written responses for commonly encountered service requests. Any of the individuals and/or service individuals described herein can provide descriptive information, (i.e. title and contents) for frequently-provided responses, which can include, for example, messages confirming that a request has been received and that same will be handled, and/or can include extensive instructions on how to handle a problem that an occupant should be handling on his own. The manager or maintenance department personnel can also select from these pre-written responses and have any response automatically posted as a response to a service request, with same being stored in a request log database.

In another preferred embodiment, the building management or other building personnel can enter service requests for other occupants who may not choose to use the system themselves, by specifying the unit number of the requesting occupant when entering a new service request.

The apparatus 1 can also provide building management or maintenance personnel with the ability to view, analyze, or summarize, maintenance requests in different manners, some of which can include viewing requests which may not have been responded to within a certain period of time, requests which may have been flagged or identified as being urgent, requests which are of a certain nature or which are included in a certain category (for example, all electrical requests for when the electrician is scheduled to perform work at the building), and/or requests which are assigned to specific building personnel or outside vendors. Building management and/or maintenance personnel can also view any and/or all requests and/or charge-back amounts for a particular time period so that occupants can be billed for services provided and/or performed on their behalf.

Any of the data and/or information described herein can be provided to the respective individual as summarized data, as charge or charge-back information for each unit, and/or as a breakdown of requests, which can include break-down percentages or service requests by service or request category. At any time, any respective manager or maintenance individual can specify and/or request the type of report which they wish to receive. Thereafter, the requested information can be provided to the individual or party. The operation of the apparatus 1 will thereafter cease at step 315.

In another preferred embodiment, the present invention can be utilized in order to collect responses and information from occupants and/or users of the system so as to assist property and building management personnel in their decision making activities.

Figure 5:
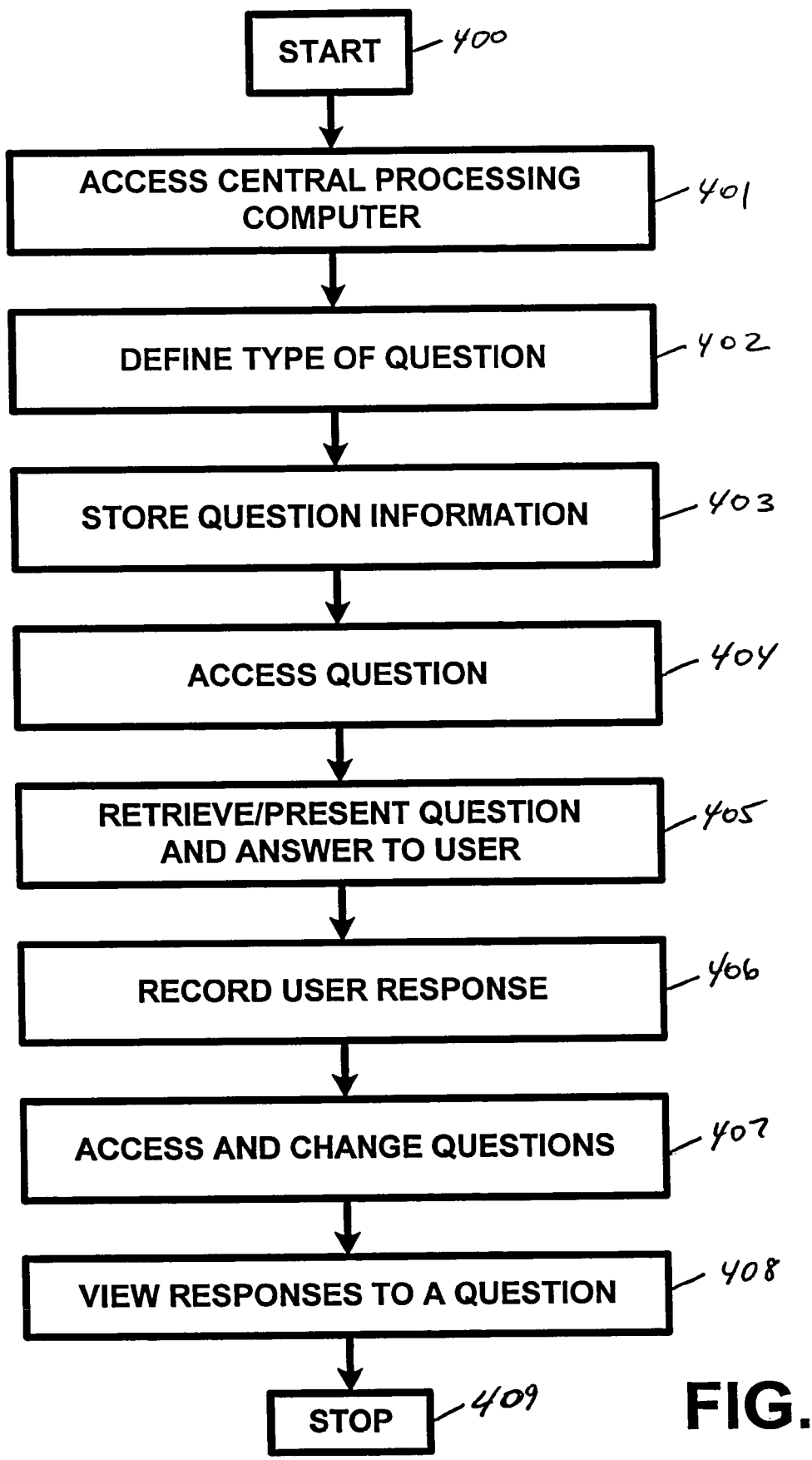
FIG. 5 illustrates a flow diagram of still another preferred embodiment method for utilizing the present invention.

FIG. 5 illustrates a flow diagram of an another preferred embodiment method for utilizing the present invention. The operation of the apparatus 1 commences at step 400. At step 401, the user, individual, or manager (hereinafter "manager"), accesses the central processing computer 10 in order to ascertain an answer to a question and/or to create a new question. At step 402, the manager defines the type of question, which can include multiple choice questions with one or multiple answers allowed, and/or freeform text or other question types. The manager can input the question and answer text and/or the question's expiration date. The manager can also provide or send information providing notification to others that the question has been posted.

At step 403, the question information is stored in the database of the central processing computer 10. At step 404, an authorized user can access the question by selecting the question title from the web page of the central processing computer 10 or the e-mail notification link.

At step 405, the question and answer text can be retrieved from the database and can be presented for viewing to the user. At step 406, the user's response can be recorded in the database of the central processing computer 10. If the question has been previously answered by another individual and/ or by a user connected with the unit, it may no longer be accessed at the central processing computer 10. The question, however, can still be accessed and the answer can be changed by the user by going to the questions section of the respective library. Once an expiration date for a question has been reached, the central processing computer 10 can prevent the user, or any individual, from viewing or answering the question.

At step 407, the manager can access and change existing questions, including changing the expiration date(s) of these questions and/or activating or deactivating a question(s). At step 408, the manager can view all responses to a selected question, by response, by response type, and/or by responding individual. The manager can also view responses as a detailed listing showing all answers, the manager's answers, the date(s) and/or time(s) of the various responses or answers, and any comments which may have been added to and/or included in any of the responses or answers. Thereafter, the operation of the apparatus 1 ceases at step 409.

In another preferred embodiment, managers can provide answers and/or responses for or to those individuals who provided responses which were not made or received on-line. These non-on-line responses can include, but are not limited to, telephone responses, in-person responses, written responses, and/or facsimile responses, and/or any other response(s) which is not received or provided via the apparatus of the present invention and/or via any of the various computers and/or communication devices of the present invention.

Figure 6:
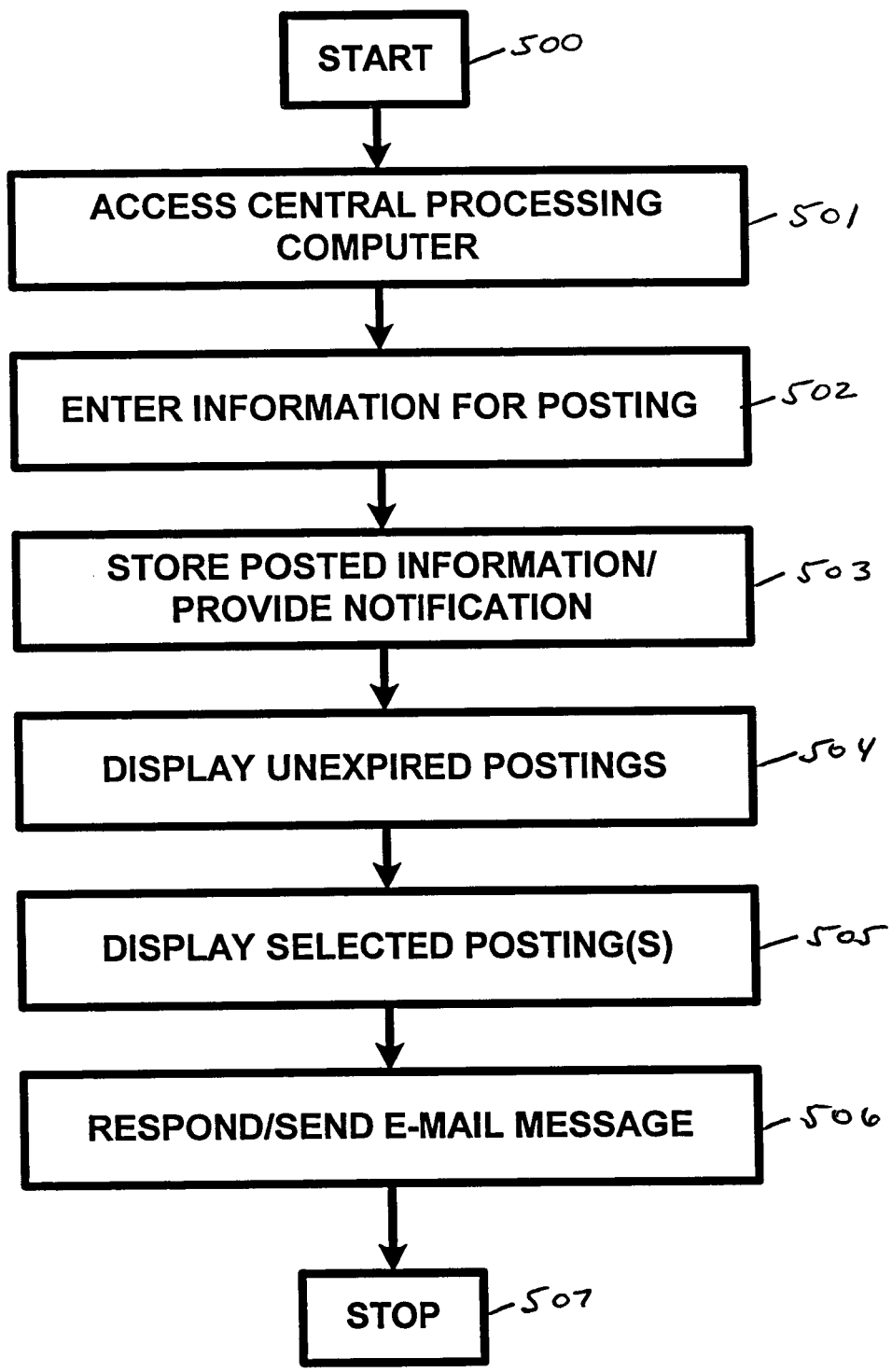
FIG. 6 illustrates a flow diagram of yet another preferred embodiment method for utilizing the present invention.

In another preferred embodiment, the present invention can be utilized by building occupants to distribute and/or post notices, information, requests, or advertisements, for viewing by other occupants of the building, via an electronic bulletin board or other suitable medium. FIG. 6 illustrates a flow diagram of another preferred embodiment method for utilizing the present invention.

The operation of the apparatus 1 commences at step 500. At step 501, the occupant accesses the central processing computer 10. The occupant desiring to post a notice can select this option from the web page of the central processing computer 10. At step 502, the occupant can enter various data and/or information for posting on the web site or web page of the central processing computer 10. The entered information can include a title, text, a related uniform resource locator (URL), an expiration date, and an e-mail address for responding to the posting. At step 503, the posted data can be stored in the database. At step 504, notification of the posting can be provided to any of the users of the present invention who or which may have requested to receive notification of such postings.

At step 504, the titles of any unexpired postings can be displayed when any occupant of that building enters an associated bulletin board. Entry into a bulletin board can be accomplished by selecting or by "clicking" on an icon or link associated with same. The titles of some of the most recent postings can be displayed automatically on the web page of the central processing computer 10. At step 505, a selected posting or postings can be displayed to the occupant.

At step 505, if the viewing occupant is the same occupant who posted the notice, or if the occupant is authorized as a property manager or building manager, the viewing occupant can be given the option to change the notice. At step 506, if the occupant desires to send an e-mail, he or she can select or "click" on a provided e-mail response address, at which time, the viewing occupant's e-mail program can be opened and can be utilized to compose an e-mail response to the specified e-mail address. The email response can then be sent. Thereafter, the operation of the apparatus 1 can cease at step 507.

In another preferred embodiment, the present invention can be utilized to provide authorized users with various address and contact information for other building and/or property occupants and/or building and/or property management and/or management personnel.

Figure 7:
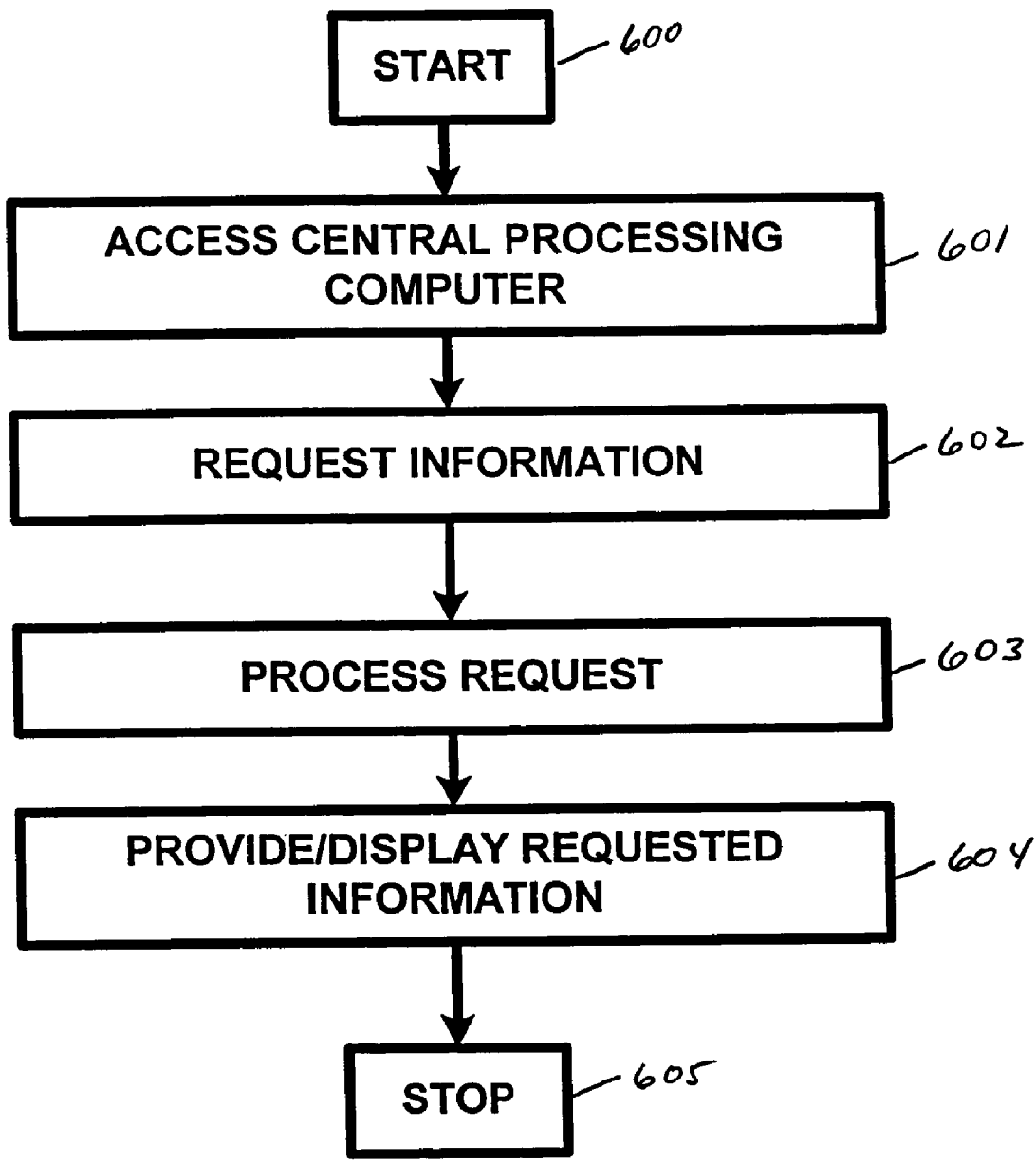
FIG. 7 illustrates a flow diagram of another preferred embodiment method for utilizing the present invention.

FIG. 7 illustrates a flow diagram of another preferred embodiment method for utilizing the present invention. The operation of the apparatus 1 commences at step 600. At step 601, the occupant or user accesses the central processing computer 10. The occupant or user, at step 602, can select or request the information which he or she desires to obtain. The information can include information and/or selections by user type (occupant, user, management, etc.) or can include information regarding a specific occupant, user, or unit.

At step 603, the central processing computer 10 will process the occupant's request and retrieve the requested information from the database. The retrieved address or addresses and/or contact information can then be displayed to the occupant at step 604. The information can be provided in detailed and/or in list form for a single entity or individual and/or for multiple entities or individuals. The occupant can, thereafter, return to step 602 and repeat the above process for another information search. When the occupant has completed his or her searching and/or obtaining of information, the operation of the apparatus 1 will cease at step 605.

In another preferred embodiment, access to the address and contact information can be restricted so that only the information of those individuals or occupants providing permission, to make their information available, will be accessible to others.

Figure 8:
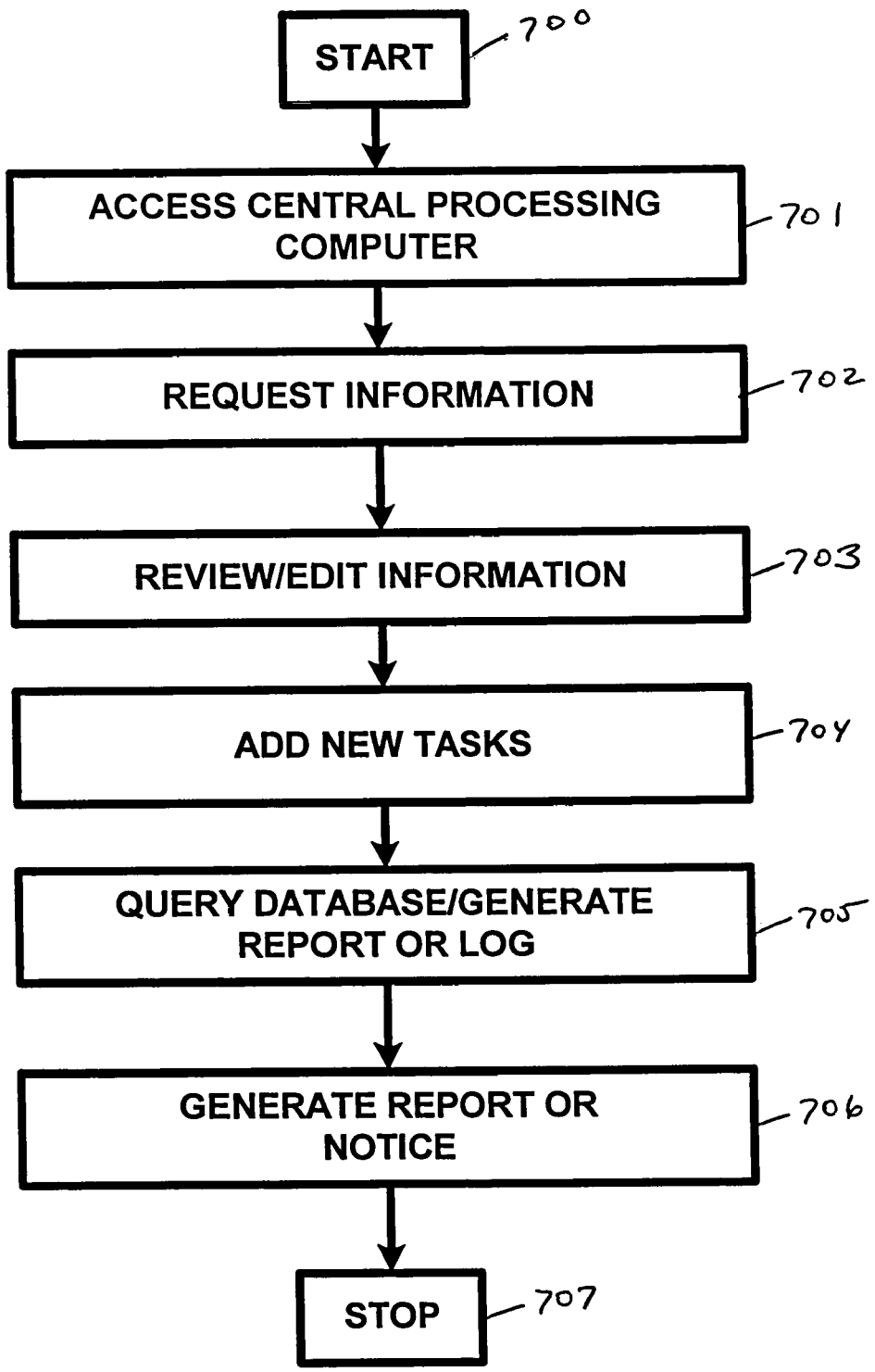
FIG. 8 illustrates a flow diagram of still another preferred embodiment method for utilizing the present invention.

In another preferred embodiment, the apparatus 1 can be utilized to establish and/or to track completion of a scheduled maintenance program for a building or property, and/or for adding scheduled tasks from either or both of an "Expert" system database and/or from an external system database. FIG. 8 illustrates a flow diagram of another preferred embodiment method for utilizing the present invention. With reference to FIG. 8, the operation of the apparatus 1 commences at step 700. At step 701, the building management personnel or user accesses the central processing computer 10 in order to access a maintenance database.

The maintenance database can be included in the database of the central processing computer 10 and/or an external database. At step 702, the user can select and/or request to receive information regarding the building or property, equipment associated with the building or property, and/or the type of task, which are or which may be relevant to the particular building or property.

At step 703, the building management personnel or user can review any information regarding any of the tasks, edit any of the task information, including adding or deleting tasks or subtasks, changing task and/or subtask description(s), and changing scheduling data. The scheduling data can include starting date, interval and/or frequency of tasks and/or maintenance, and any party, entity, and/or individual, assigned to address and/or to perform the task. The apparatus 1 and/or the central processing computer 10 can facilitate the assignment and/or the delegation of any of the herein-described tasks to in-house personnel and/or to outside contractors and/or agencies. At step 704, new tasks can be added to the database of the central processing computer 10, if desired.

At step 705, the central processing computer 10 can query the database and/or the external database, at specified intervals (i.e. every midnight), and can generate an active service request report or log for any task(s) and/or subtask(s), which can be added and/or stored in the maintenance task database described herein.

At step 706, if the building manager has previously requested, the central processing computer 10 can generate an appropriate report or notice, to the building manager, maintenance manager, and/or outside contractor or vendor, responsible for the respective task(s). The report or notice can notify the respective individual or party that the task is, or has become, active and/or that it is, or may have become, a priority.

The notification message can be provided to the respective individual or party by any means selected, including email message, fax transmission, pager or beeper message, telephone message, and/or by any other means. Thereafter, the operation of the apparatus 1 will cease at step 707.

Figure 9:
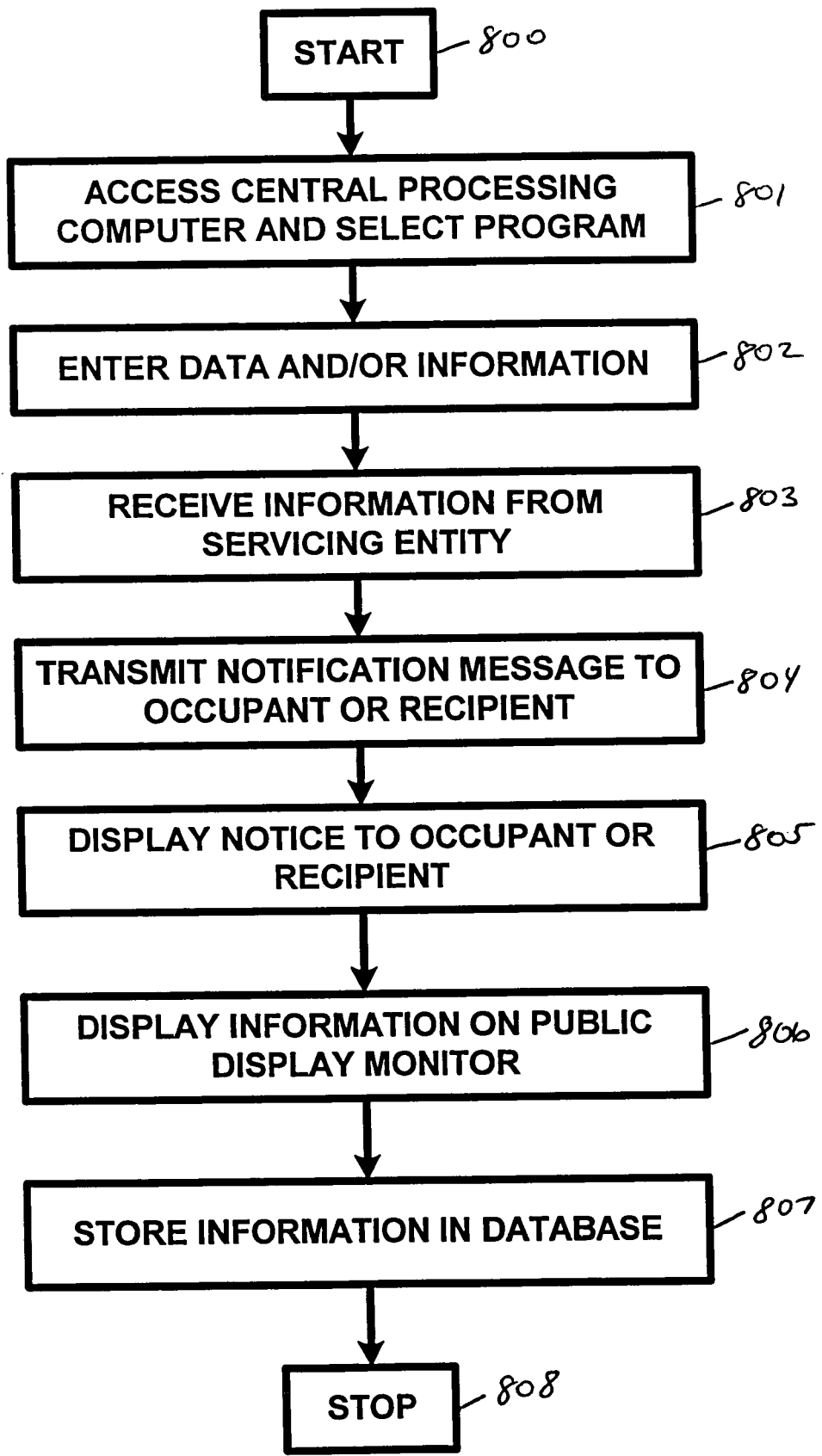
FIG. 9 illustrates a flow diagram of yet another preferred embodiment method for utilizing the present invention.

In another preferred embodiment, the apparatus and method of the present invention can be utilized to record information, track information, and/or to provide notification, regarding deliveries, shipments, or inbound package deliveries. FIG. 9 illustrates another preferred embodiment method for utilizing the present invention, in flow diagram form.

The operation of the apparatus 1 commences at step 800. At step 801, the individual responsible for receiving deliveries, shipments, and/or packages (usually the front desk attendant or gate attendant), accesses the central processing computer 10 and selects an appropriate delivery, shipment and/or package tracking program. At step 802, the individual can enter data and/or information relating to an inbound delivery, a shipment, and/or a package, into the central processing computer 10.

The data and/or information entered by the individual can include the data and/or information regarding one or more building or property occupants by name, unit or apartment number, descriptions of regular deliveries such as, for example, overnight package delivery, laundry delivery, and/or the delivery of any other product(s) and/or service(s). The data and/or information can also include any other pertinent and/or necessary information. At step 803, the central processing computer 10 can also receive data and/or information directly from various package delivery services via a communication network, such as, but not limited to, the Internet, the World Wide Web, and/or any other communication network. The data and/or information received from the package delivery service or services can include delivery and/or shipment information, tracking information, and/or tracking identification information for or regarding each scheduled and/or unscheduled delivery, shipment, and/or package. The information can also include sender information and/or recipient information.

At step 804, if the occupant and/or recipient of the package has so requested, a notification message, such as any message and/or transmission described herein, can be sent or transmitted to the occupant or recipient advising them of the incoming delivery, shipment, or package, and/or of the receipt of the respective delivery, shipment, or package. At step 805, a message and/or other notification can be displayed on the occupant's or the recipient's user computer 20 indicating that a delivery, shipment, and/or package, is incoming and/or that it has been received by the building and is awaiting pick-up by the occupant or recipient.

At step 806, the central processing computer 10 can also display any of the notification information provided at step 805 on a public display monitor in the building entranceway, elevator, or other public area, thereby providing a listing of deliveries, shipments, and/or packages, available for pick-up, along with the unit(s) and/or apartment(s) associated with the deliveries, shipments, or packages. Thereafter, a delivery, shipment, or package, can be picked-up.

Information regarding the pick-up can be stored in the database of the central processing computer 10 at step 807. At step 807, once a delivery, shipment, or package, has been picked-up by the occupant or recipient, the front desk personnel can record the pick-up information along with the date and time of the pick-up, and store the information in the database. The pick-up information can be stored either automatically and/or manually by the recording individual. Thereafter, the operation of the apparatus 1 will cease at step 808.

In another preferred embodiment, if the building management does not desire to record the pick-up information for each delivery, shipment, or package, the central processing computer 10 can be programmed to monitor and/or check the records of outstanding deliveries, shipments, or packages, and designate them as being inactive upon the expiration of a specified time period, such as, for example, three (3) days.

In another preferred embodiment of the present invention, occupants can utilize the central processing computer 10 to arrange package pick-up and package shipment by a package delivery service. In this embodiment, the occupant can store his or her account information and payment information in an unit profile in the database of the central processing computer 10.

The occupant can access the central processing computer 10, select a "Send a Package" program from the respective web page, select a carrier, and enter the package delivery information. The data and/or information can then be stored in the database of the central processing computer 10. Thereafter, the shipment information or instructions can be transmitted to the appropriate package delivery service for appropriate servicing.

A tracking number can be received at that time, and/or at any other time, from the delivery service. The package can thereafter be picked-up by the delivery service with the pick-up event being recorded in the database of the central processing computer 10 by the front desk personnel. The data and/or information regarding the pick-up of a shipment can also be updated by the package delivery service. If so desired or requested, the occupant can be notified electronically when a package is picked-up for shipment. Further, the central processing computer 10 can continue to track packages in shipment until delivery is effectuated, and can so update the database of the central processing computer 10 and provide notification to the occupant when the package has been delivered. The occupant can also access and/or view information regarding the status of package shipments via the central processing computer 10 and/or the user computer 20.

Figure 10:
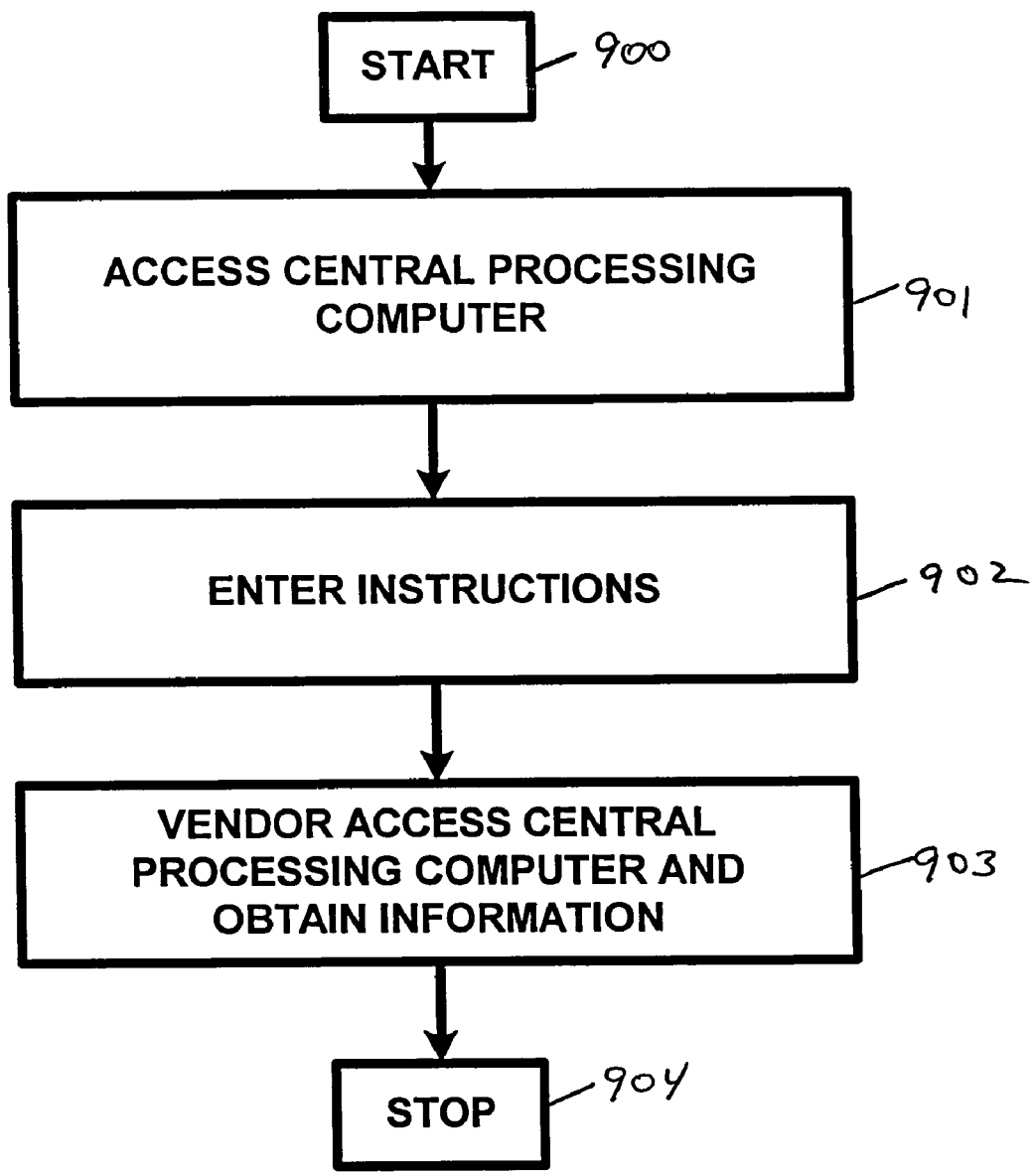
FIG. 10 illustrates a flow diagram of another preferred embodiment method for utilizing the present invention.

In another preferred embodiment, the apparatus and method of the present invention can be utilized in order to coordinate services and/or to provide information to affiliated or unaffiliated operators and/or service providers who or which are providing services, such as, but not limited to, newspaper delivery or parking garage services, to occupants of the building or property. FIG. 10 illustrates another preferred embodiment method for utilizing the present invention, in flow diagram form.

The operation of the apparatus 1 commences at step 900. At step 901, the occupant accesses the central processing computer 10 and enters data and/or information into the central processing computer and/or the database of same. The data and/or information can include information necessary for the proper handling of the occupant's request and/or appropriate servicing of the occupant's account. For example, regarding newspaper delivery, this data and/or information can include the types of newspapers desired, and the days on which delivery is requested. Regarding parking garage services, the data and/or information can include occupant account number, vehicle type, vehicle color and vehicle license plate number, as well as typical vehicle pick-up time(s).

At step 902, the occupant can enter any special and/or temporary instructions regarding any of these services. For example, regarding newspapers, this data and/or information can include temporary stopping and/or restarting dates. For parking garage services, this data and/or information can include a temporary change in vehicle pick-up time(s).

At step 903, each vendor or service provider can access the central processing computer 10 and access and view data and/or information pertinent to itself, including any instructions, special and/or otherwise, or temporary changes of and to any of the herein-described instructions and/or other information. Returning once again to the newspaper delivery example, the data and/or information can include a list of all deliveries, and/or a list of change requests for that particular day. Parking garage data and/or information can include a list of all vehicles sorted by pick-up times and/or other instructions and/or instruction change requests. Thereafter, the operation of the apparatus 1 will cease at step 904.

Figure 11:
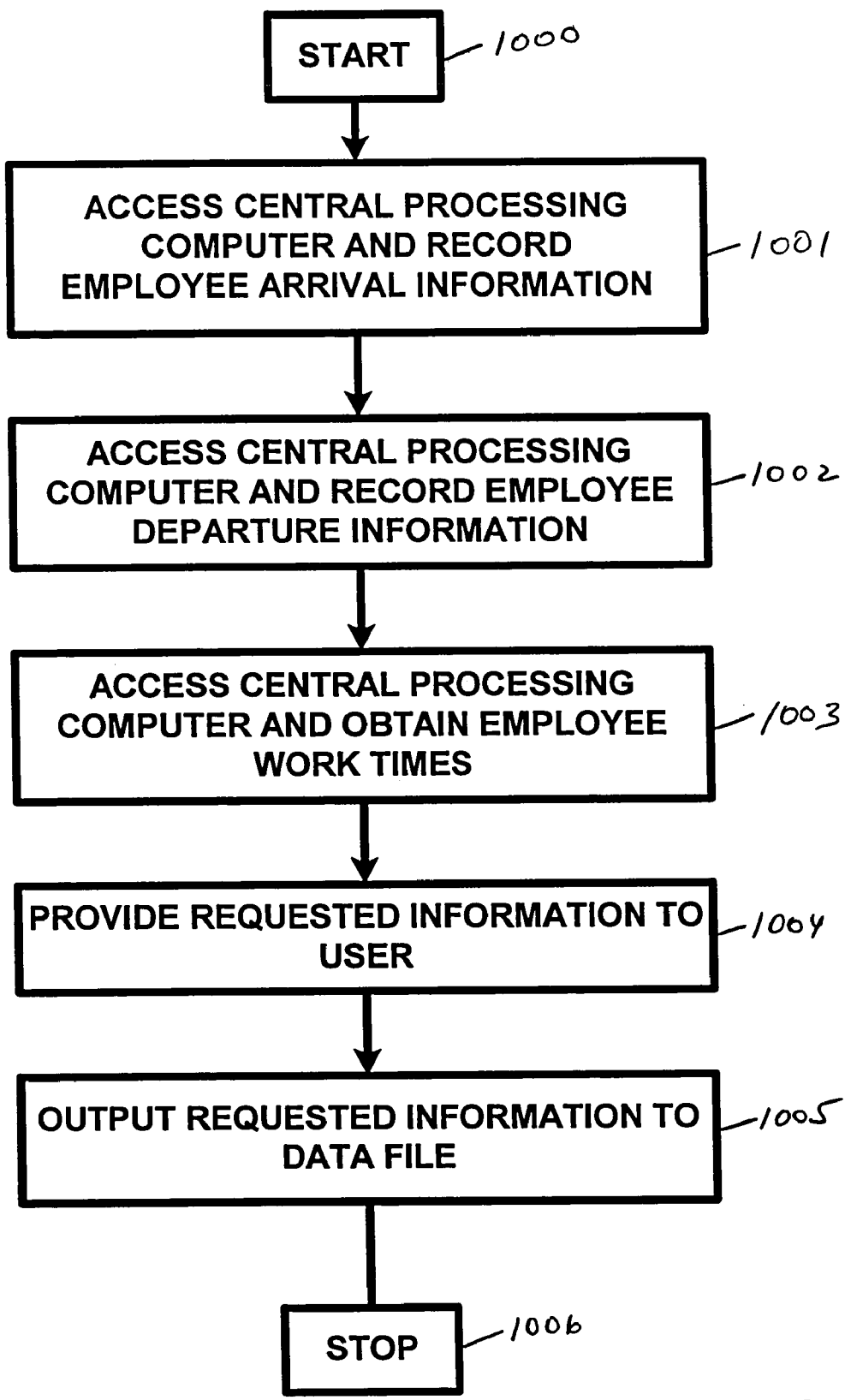
FIG. 11 illustrates a flow diagram of still another preferred embodiment method for utilizing the present invention.

In another preferred embodiment, the present invention can be utilized in order to tabulate employee hours worked. FIG. 11 illustrates another preferred embodiment method of utilizing the present invention, in flow diagram form. The operation of the present invention commences at step 1000. At step 1001, the employee of the building and/or property accesses the central processing computer 10 in order to record their arrival and/or their presence at work or on-duty. The employee can log-in to the central processing computer 10 by entering a password, by utilizing a palm scanner, and/or by utilizing any other identification device or technology, biometric or otherwise. Log-in can be performed via a user computer 20.

At step 1002, the employee can access the central processing computer 10 in order to record his or her leaving work and/or the end of his or her work shift to tour of duty. At step 1003, an authorized user (typically the manager or building superintendent) can access the central processing computer 10 and access and/or view employee work times, reporting times, arrival times, and/or leaving times, for any employee and/or for all employees. Data and/or information can then be processed by the central processing computer 10 so as to provide, and/or to organize, and/or to sort this data and/or information for any given day, time period, in a detailed and/or in a summary form.

At step 1004, the requested data and/or information can be provided at the user computer 20, and can include time or hour totals as well as a calculation of worked hours, including regular or overtime hours, if requested. At step 1005, the requested data and/or information can also be output to a data file which may be compatible with an employer's payroll processing format, if desired. The output file can also be downloaded to an employer's or to a manager's user computer or other computer and can be transmitted or sent directly to a payroll processing provider, via a communication network, the Internet, and/or the World Wide Web. Thereafter, the operation of the apparatus 1 will cease at step 1006.

In another preferred embodiment, the central processing computer 10 can also process and/or provide a listing of employees, who are currently at work, to occupants or other inquiring individuals.

Figure 12A:
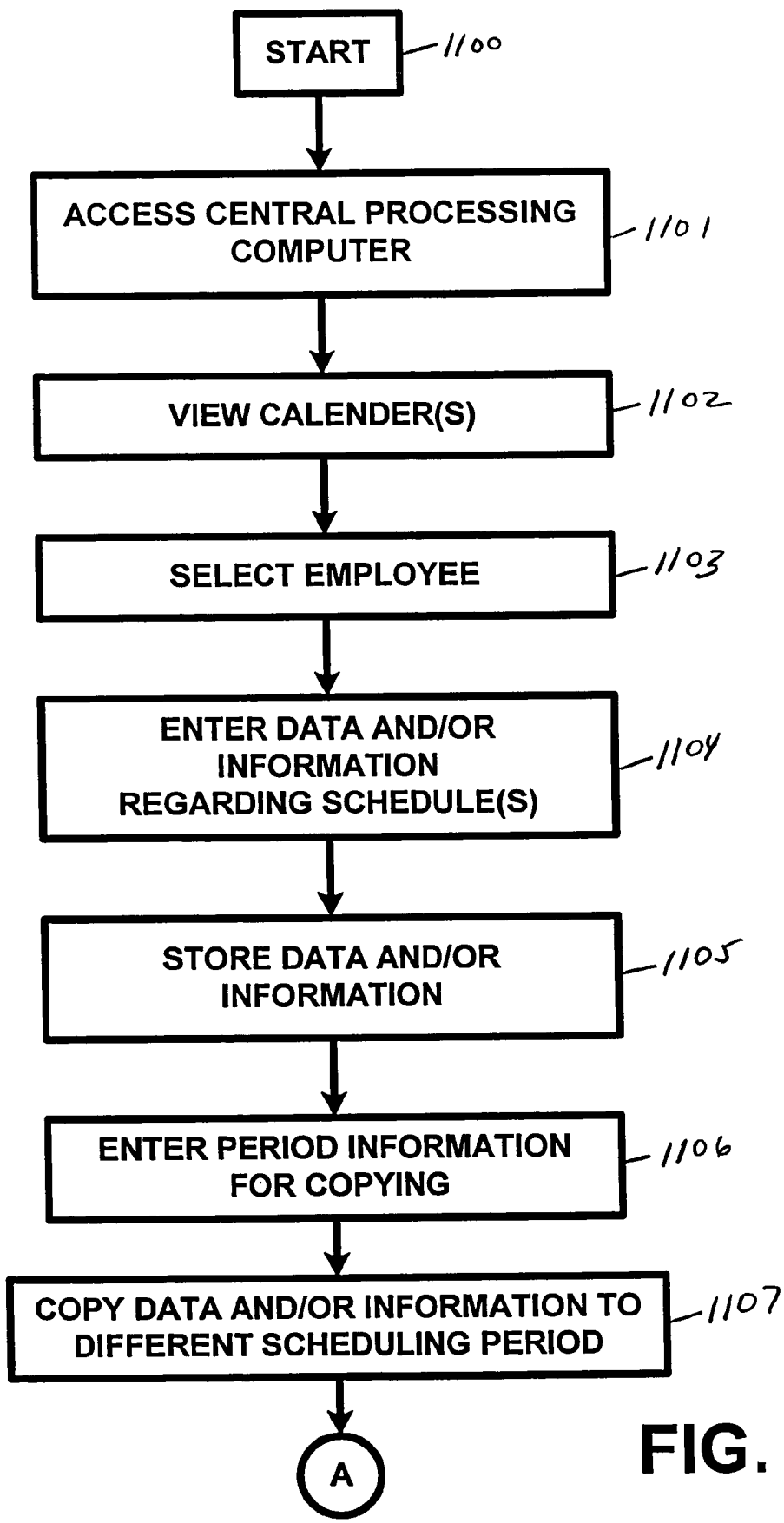
FIGS. 12A and 12B illustrate a flow diagram of yet another preferred embodiment method for utilizing the present invention.
Figure 12B:
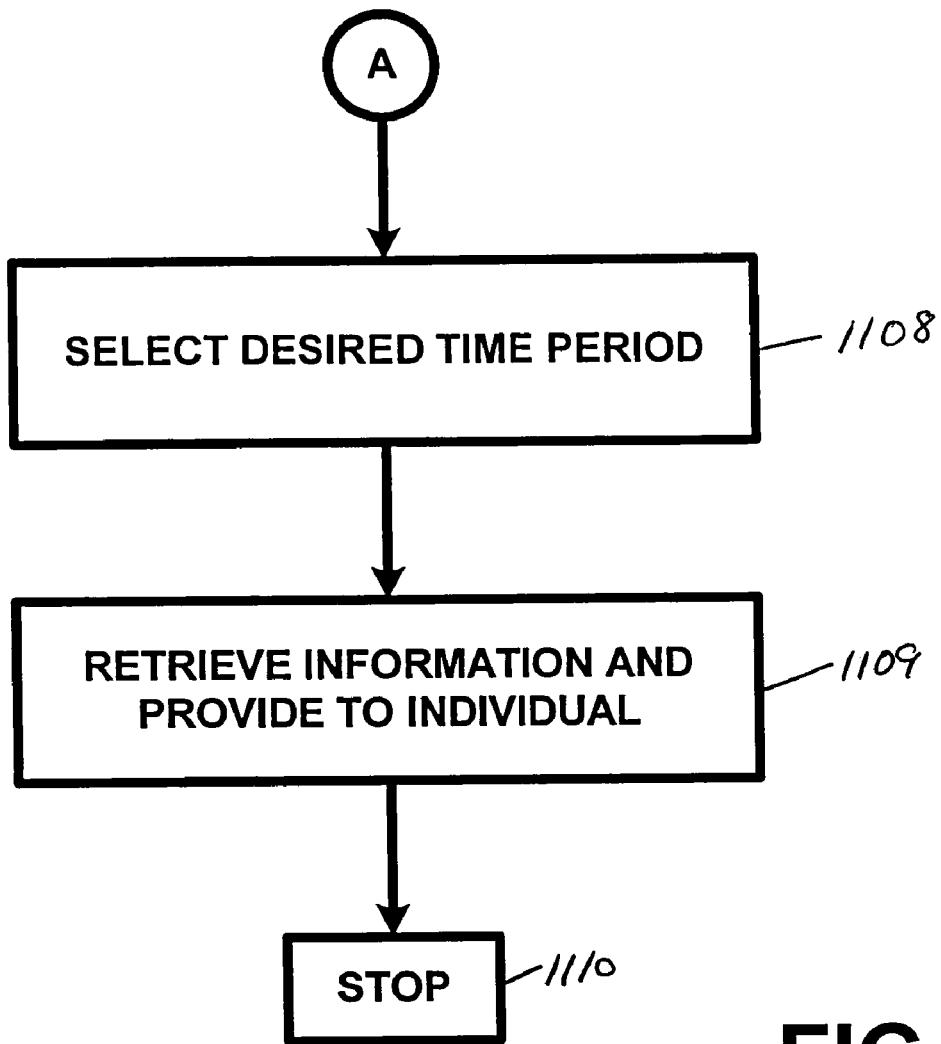

In another preferred embodiment, the present invention can be utilized in order to schedule employee work hours, and/or to compare actual hours worked against budgeted and/or scheduled hours for a given task or procedure. FIGS. 12 and 12B illustrate another preferred embodiment method of utilizing the present invention, in flow diagram form. The operation of the apparatus 1 commences at step 1100. At step 1101, the manager or building superintendent accesses the central processing computer 10 and enters an inquiry regarding a time period of interest. This time period, for example, can be a period of one (1) week. At step 1102, the manager or building superintendent can then view a calendar of scheduled employees and their hours for each day of that particular time period.

At step 1103, the manager or building superintendent can select an employee from the list of employees stored in the central processing computer 10. At step 1104, the manager or building superintendent can enter, into the central processing computer 10, data and/or information regarding starting and ending work hours for an employee or group of employees, for each day, and/or changes to the existing data and/or information regarding the employee and/or employees. The manager or building superintendent can also, at step 1104, schedule employees for certain tasks and/or for certain assignments. The data and/or information can then be stored in the database of the central processing computer 10 at step 1105.

The manager or building superintendent can return to step 1104 to schedule an additional employee, if desired. The manager or building superintendent can also return to step 1102 in order to view the work schedule(s) of an employee or group of employees. In another preferred embodiment, data and/or information for a different work period can be duplicated into another work period, thereby speeding up data entry for a given period(s).

Returning once again to FIGS. 12A and 12B, at step 1106, the manager or building superintendent can enter a starting date and/or an ending date of a time period which is to be copied, and a starting date and/or an ending date of a time period to which the information is to be copied. At step 1107, the data and/or information for all employees and/or for all scheduled time periods can be copied and/or reproduced to a different scheduling period. This copying and/or reproduction of scheduling information can be provided in order to provide matching information and/or matching information for any time period. The operation of the apparatus 1 will thereafter return to step 1102 where the manager or building superintendent can access or view the newly copied data and/or information and/or effect changes and/or modifications to same, if desired.

In another preferred embodiment, the manager or an authorized user can request to access and/or to view a comparison of days and hours scheduled versus actual days and hours worked for each employee or group of employees. This embodiment can also utilize data and/or information obtained via any of the other herein-described preferred embodiments. At step 1108, the manager or authorized individual can select a desired time period, which, for example, can be a one week period, and the type of scheduling details desired, which, for example, can be information for each day separately or for a total of one week. This information can also include information regarding, each employee separately, and/or information regarding all employees. At step 1109, the requested data and/or information can be retrieved from the database of the central processing computer 10 and can then be provided to the requesting individual on his or her respective user computer 20. Thereafter, the operation of the apparatus 1 will cease at step 1110.

Figure 13A:
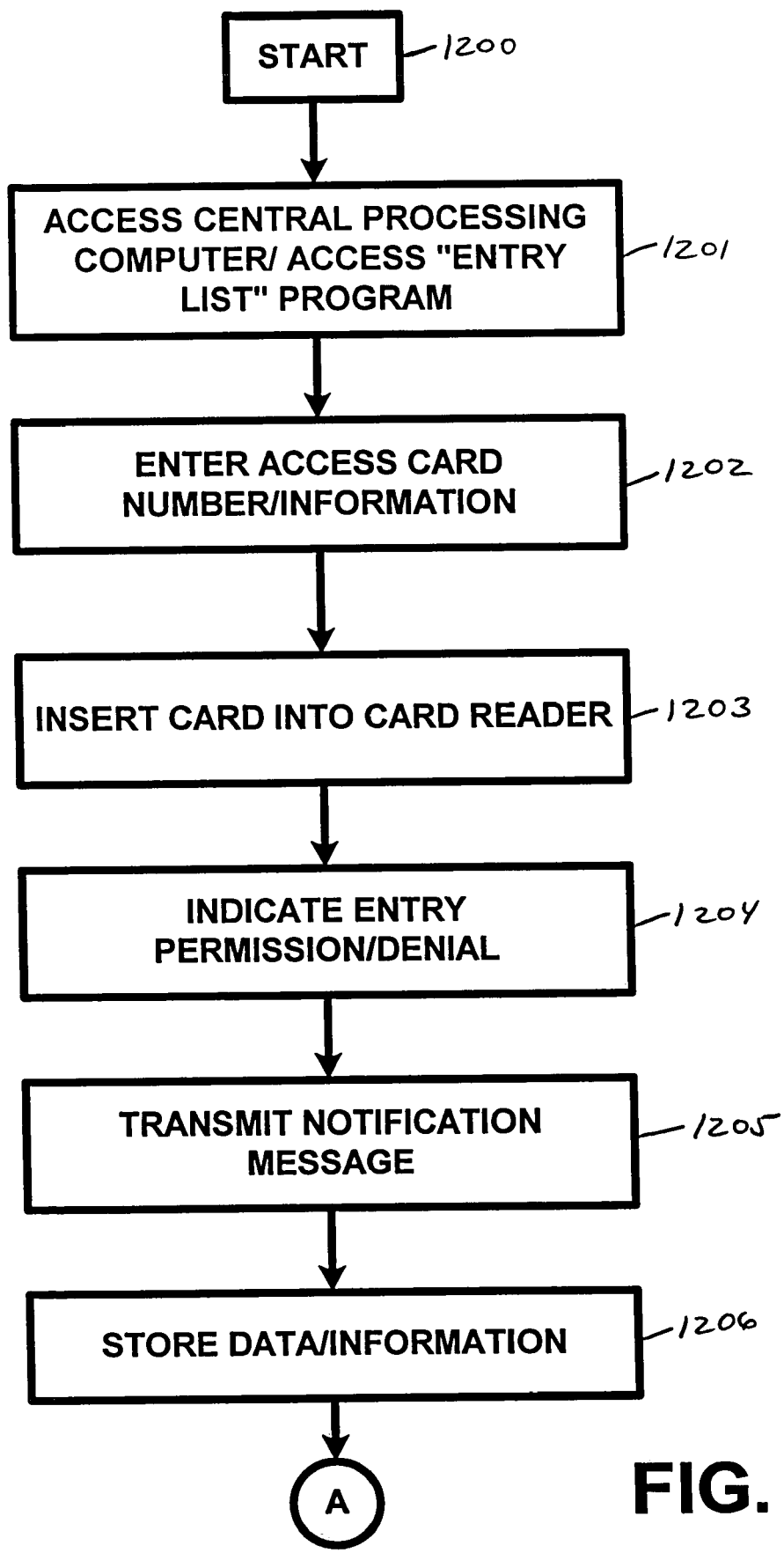
FIGS. 13A and 13B illustrate a flow diagram of another preferred embodiment method for utilizing the present invention.
Figure 13B:
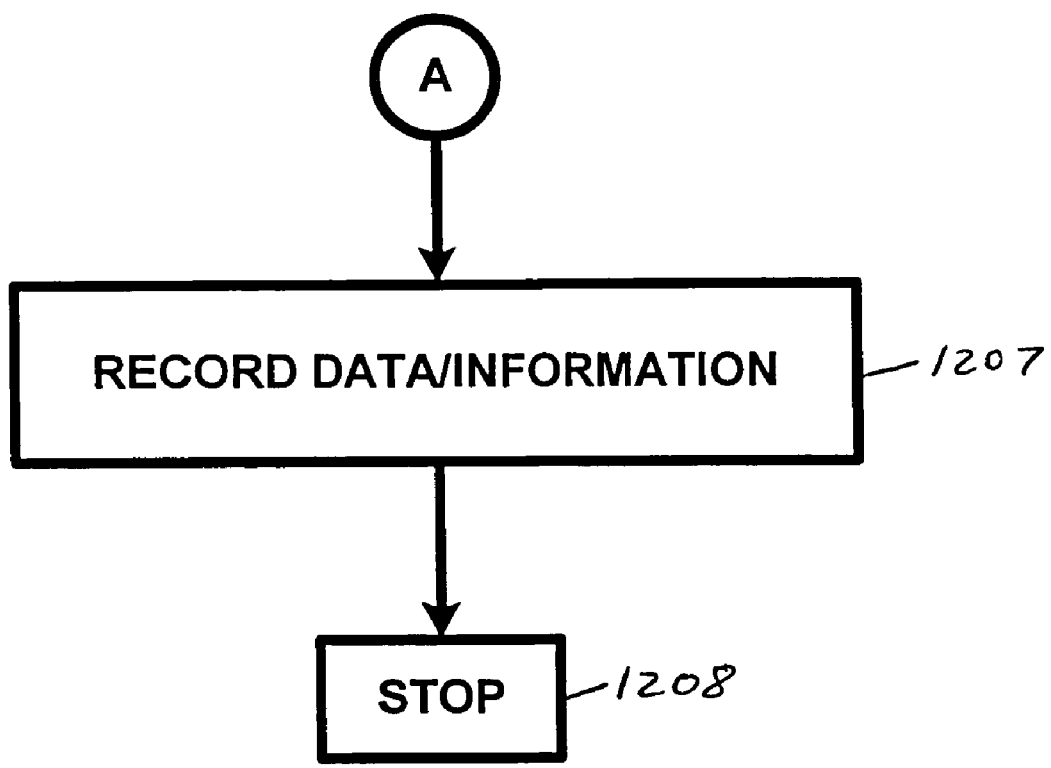

In another preferred embodiment, the present invention can be utilized in order to control access to a building or property for occupants, owners, employees of occupants, and/or visitors, regular and/or otherwise. FIGS. 13A and 13B illustrates another preferred embodiment method of utilizing the present invention, in flow diagram.

In the embodiment of FIGS. 13A and 13B, the apparatus 1 further includes at least one magnetic card reader (not shown) at the building entranceway, front desk, or front gate. The magnetic card reader can be utilized in conjunction with magnetic cards which can be encoded, numerically, and/or otherwise, and/or which can typically be distributed by building or property management to each occupant for their use and/or for re-distribution to their respective employees or visitors. The magnetic card reader can be connected with the central processing computer 10.

The operation of the apparatus 1 commences at step 1200. At step 1201, the occupant, who wishes to allow building access to a particular individual or cardholder, accesses the central processing computer 10 and accesses an "Entry List" program. At step 1202, the occupant can enter a new access card number and/or any other information related to an access profile which may be related to that card number.

The data and/or information can include the name of the cardholder, times of authorized access and/or entry (i.e. days of the week, time of day, hours of the day, etc.), access or entry permission for a specific date or time period, and/or a status of an access profile (i.e. active or inactive). At step 1203, the individual or cardholder seeking access and/or entry into the building can insert their card into the magnetic card reader. The central processing computer 10 can process the data and/or information on the card in conjunction with the data and/or information stored in the database of the central processing computer 10, and thereafter, determine whether the individual or cardholder is to be allowed entry.

At step 1204, an indication regarding entry permission or entry denial can be presented at the magnetic card reader in any number and/or combination of ways, including the playing of audible tone(s), synthesized speech, a visual display on the front desk computer terminal, and/or through the operation and/or release of an automated turnstile and/or a door. At step 1205, if requested by the occupant and/or if listed in the respective unit's profile, a notification message can be sent or transmitted to the occupant identifying the card number, the individual's name, the cardholder's name, the date and time of the entry and/or the attempted entry, and whether entry permission was granted or denied.

At step 1206, the data and/or information can be stored in the database of the central processing computer 10 for future processing, review, and/or use, for security and/or other purposes. For additional security, at step 1207, the individual or cardholder can be required to insert their card again when they leave the building or property. Data and/or information related to the individual's leaving of the building or property can also be recorded in the database of the central processing computer 10. Notification of the individual's or cardholder's exit from the building or property can also be sent to the occupant, if requested, and/or if the request for this information is in the occupant's unit profile. Thereafter, the operation of the apparatus 1 will cease at step 1208.

Figure 14A:
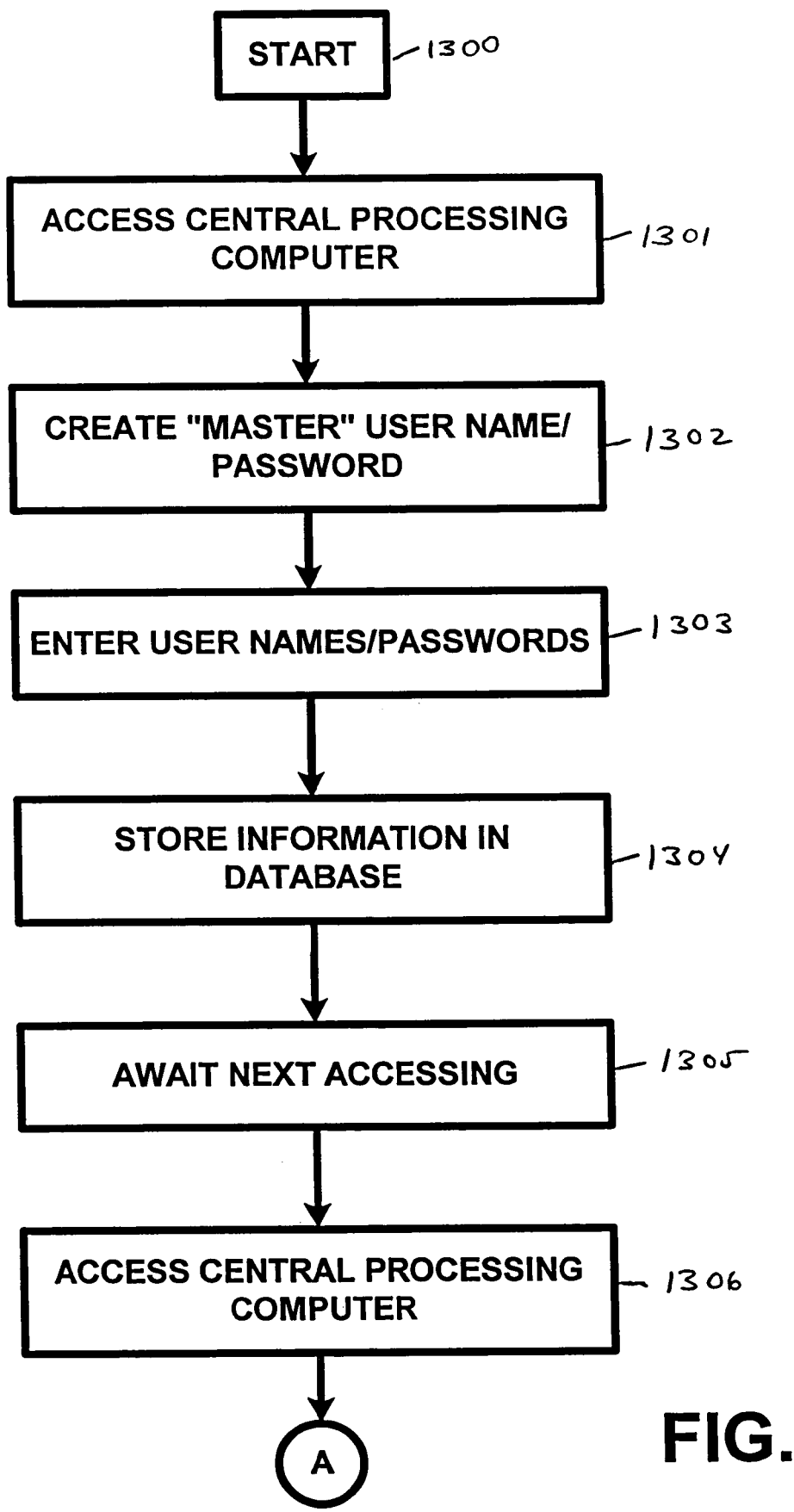
FIGS. 14A and 14B illustrate a flow diagram of still another preferred embodiment method for utilizing the present invention.
Figure 14B:
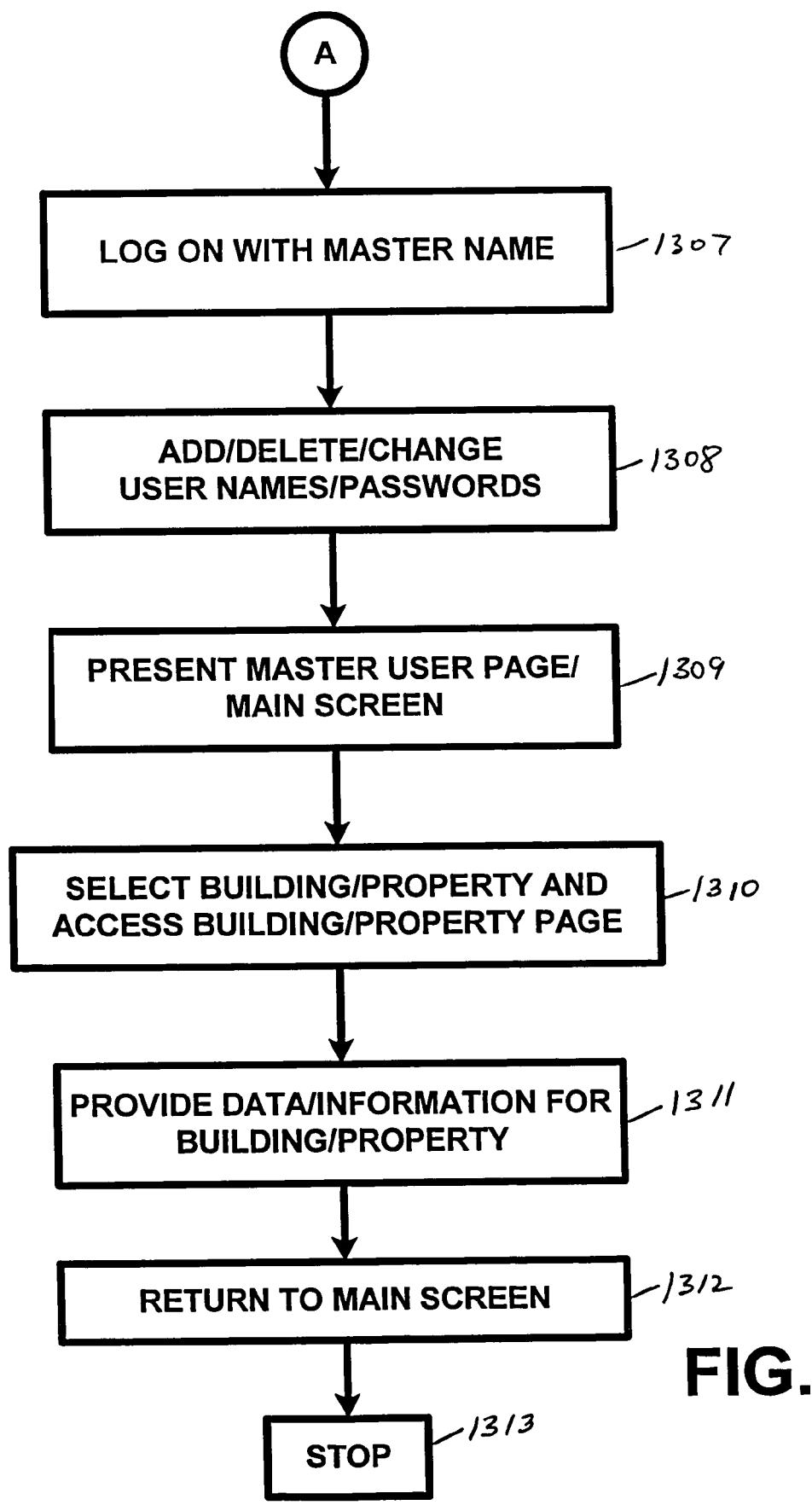

In another preferred embodiment, the apparatus and method of the present invention can be utilized in order to provide building and property information for multiple buildings and/or properties. In this embodiment, the apparatus and method of the present invention can be utilized in order to provide building and/or property management and/or maintenance data and/or information in a unified manner. FIGS. 14A and 14B illustrates another preferred embodiment for utilizing the apparatus and method of the present invention. The operation of the apparatus 1 commences at step 1300. At step 1301, the manager or user of the present invention can access the central processing computer 10. The manager or user may have different log-in user names each corresponding to a different building or property which the manager or user is responsible for. At step 1302, the manager or user (hereinafter "manager") can create a master user name and password.

At step 1303, the manager can transmit to, and/or enter into, the central processing computer 10, all of the various user names and passwords which are associated with each of the manager's buildings or properties. At step 1304, the information provided by the manager is stored in the database of the central processing computer 10. Thereafter, the operation of the apparatus 1 can, at step 1305, await the manager's next accessing of the apparatus 1.

At step 1306, the manager can once again access the central processing computer 10. At step 1307, the manager can log on to the central processing computer 10 by utilizing his, her, or its master user name. At step 1308, the manager can add, delete, or make changes to, any of the previously entered user names and/or passwords. At step 1309, the central processing computer 10 will transmit to, or present, the manager with a master building page or main screen which can contain all of the user names for all of the buildings or properties for which the manager is registered. The name of the building or property which corresponds to the user name can also be displayed along with a hyperlink to that particular building or property.

At step 1310, the manager can select the building or property and an access the building page and/or database for same without having to re-enter a user name and/or password for that particular building or property. At step 1311, the manager can provide any of the herein-described data and/or information regarding the specific building or property. Thereafter, at step 1312, the manager can exit the database for the building or property and return to the main screen. Any and/or all of the display screens associated with any of the buildings or properties can provide a link(s) or hyperlink(s) to and between the master page so as to provide a mechanism by which a master user can freely move from a building page to the master page. In this manner, the manager can freely access and/or provide updates for or regarding any of the buildings or properties under his or her management.

In another preferred embodiment, the master page can provide information and/or functionality in order to allow a master user or manager to obtain aggregated and/or integrated data and/or information for any and/or all of the buildings or properties under his or her management. For example, the manager can request to view all maintenance requests for any and/or all of the buildings or properties under his or her management.

The manager can also request to receive any of the herein-described information and/or can perform any of the herein-described functions regarding maintenance requests for any one or more of the buildings or properties under his or her management. The manager can also request information by status (i.e. open, closed, on-hold) or can sort the information by type. The manager can also request to obtain any of the other information described as being utilized or processed in any of the embodiments described herein. Thereafter, the central processing computer 10 can process the request and provide the information to the manager.

The preferred embodiment of FIGS. 14A and 14B can also be utilized by any users of the present invention who or which have an interest in, and/or who or which are associated with, multiple buildings or properties and/or multiple units within any one or more buildings or properties. For example, a tenant in more than one building can access information regarding those buildings. Similarly, a vendor providing goods or services to more than one building or property can access information regarding each one or all of these buildings or properties. Thereafter, the operation of the apparatus 1 will cease at step 1313.

Figure 15:
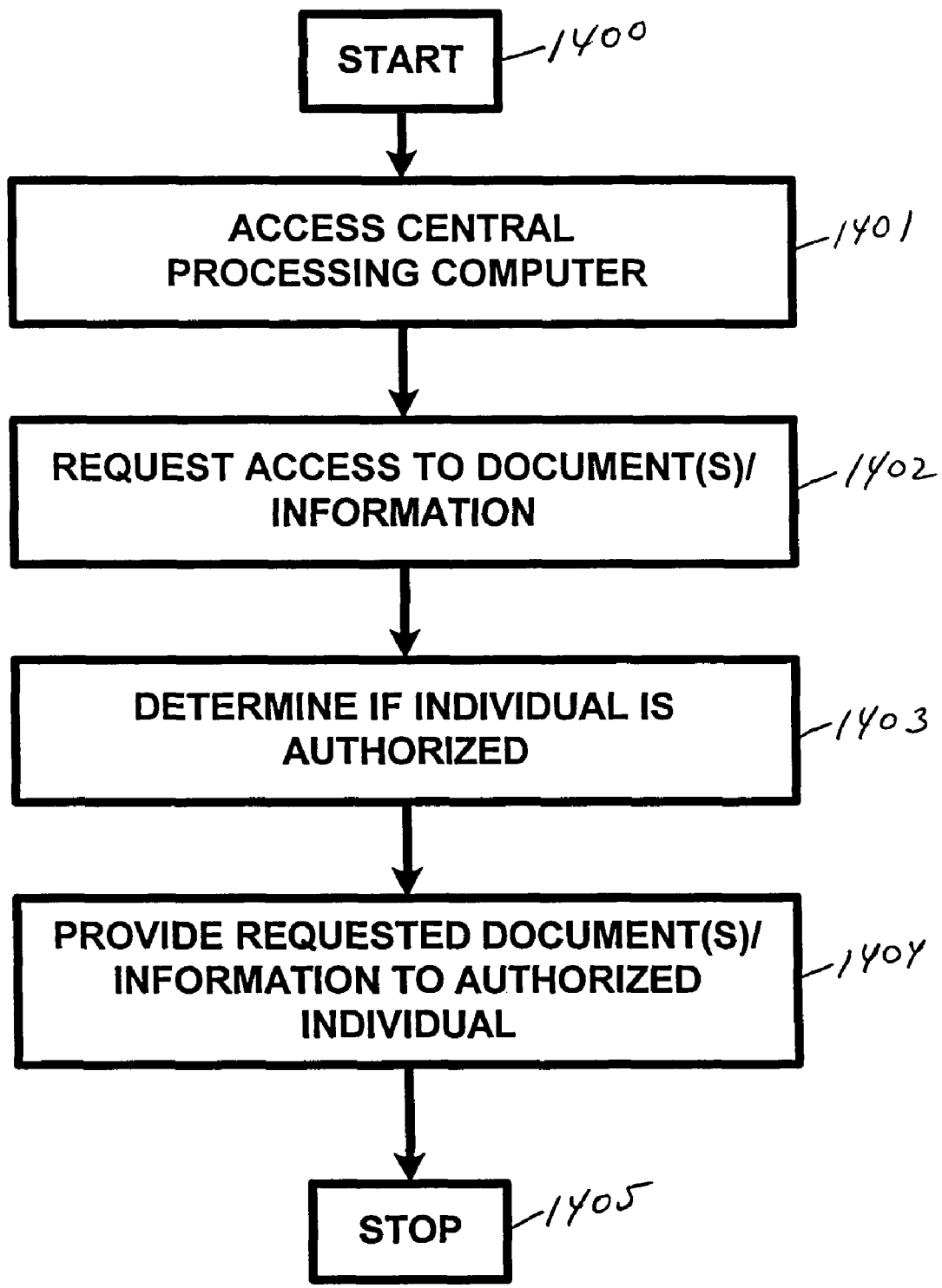
FIG. 15 illustrates a flow diagram of another preferred embodiment method for utilizing the present invention.

In another preferred embodiment, the apparatus and method of the present invention can be utilized in order to provide information to decision-making individuals associated with a building or property, such as, for example, members of the Board of Directors, or members of the House Committee for a respective building or property. In this embodiment, any of the documents, information, and/or notices, described herein, can be entered into the database of the central processing computer 10 with access thereto being limited to, and/or being reserved for, only those individuals or entities, such as members of the Board of Directors or the House Committee for the particular building or property. Those individuals and/or entities having access to the documents, information, and/or notices, can be pre-specified or be pre-authorized by the managers of the building or property. FIG. 15 illustrates another preferred embodiment for utilizing the apparatus and method of the present invention.

The operation of the apparatus of FIG. 15 commences at step 1400. At step 1401, the individual or user accesses the central processing computer 10. At step 1402, the individual or user requests access to the restricted access documents, information, or notices. At step 1403, the central processing computer 10 can determine whether the individual is an authorized individual. If the individual is an authorized individual, the central processing computer 10 will, at step 1404, provide the requested information to the individual. If the individual is not an authorized individual, the request for access to the documents, information, or notices, will be denied. Thereafter, the operation of the apparatus 1 will cease at step 1405.

In another preferred embodiment of the embodiment of FIG. 15, the present invention can be utilized in order to circulate surveys to, and/or obtain survey responses from, certain authorized individuals, such as, for example, members of a building's Board of Directors, members of a House Management Committee, and/or any managers and/or other individuals having, or holding, a similar decision-making position or capacity.

Figure 16:
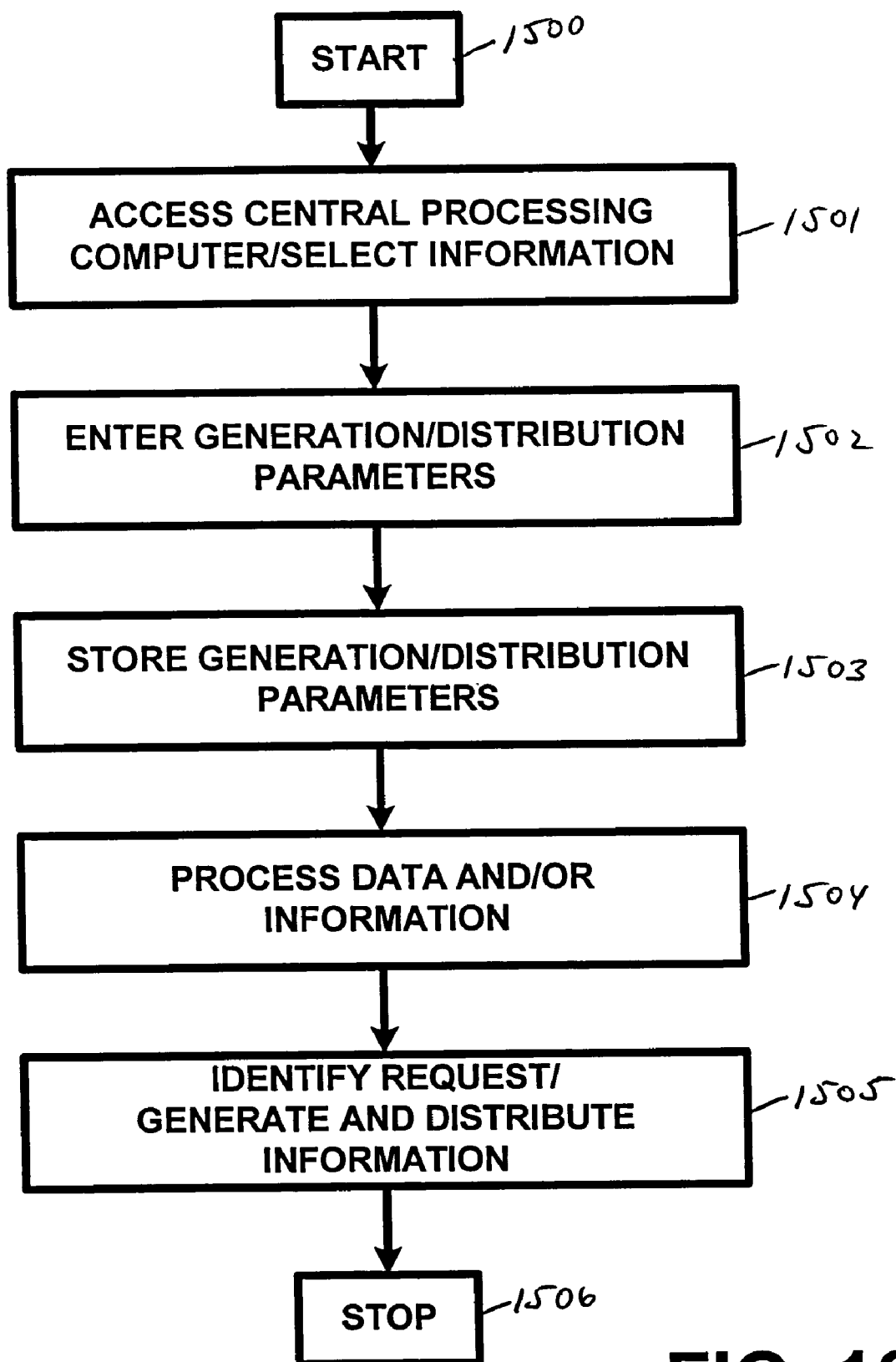
FIG. 16 illustrates a flow diagram of still another preferred embodiment method for utilizing the present invention.

In another preferred embodiment, the present invention can be utilized in order to provide for the distribution of specific lists, listings, or reports, to certain users or individuals on a scheduled basis. These lists, listings, or reports, can be provided in addition to any of the event-driven information notifications described above. FIG. 16 illustrates another preferred embodiment method for utilizing the present invention, in flow diagram form.

The operation of the apparatus 1 commences at step 1500. At step 1501, the building management individual accesses the central processing computer 10 and selects a list, listing, or report, the distribution of which he or she desires to schedule. Examples of lists, listings, or reports, which can be scheduled for distribution could be a daily listing of all open maintenance requests, an early morning listing of vehicle pick-up times, a monthly listing of emergency instructions, or a monthly listing of all occupant names and addresses for any and/or all units.

At step 1502, the frequency of generation, and/or the time of distribution, of the list(s), listing(s), or report(s), as well as the mode or manner of distribution, the distribution method, which can include e-mail messaging, fax transmission, beeper or pager messaging, telephone messaging, and/or other wired or wireless communication methods, can be entered into the central processing computer 10. At step 1503, the report distribution data and/or information can be stored in the database of the central processing computer 10. At step 1504, the central processing computer 10 processes the data and/or information in conjunction with other data and/or information which can be stored in the database of the central processing computer 10. The data and/or information regarding the listing or report, the generation of same, and/or the distribution of same, can be processed at regular intervals and/or at any other time, with the list, listing, or report, being generated and/or distributed when it may be due, requested, and/or at any other time.

At step 1505, if the central processing computer 10 identifies a distribution information request which is due, the central processing computer 10 accesses the database in order to obtain the required or needed information, generates the respective list, listing, or report, and distributes the list, listing, or report, to an output device and/or to a user computer 20 associated with an individual or user who can receive the list, listing, or report. Thereafter, the operation of the apparatus 1 ceases at step 1506.

Figure 17:
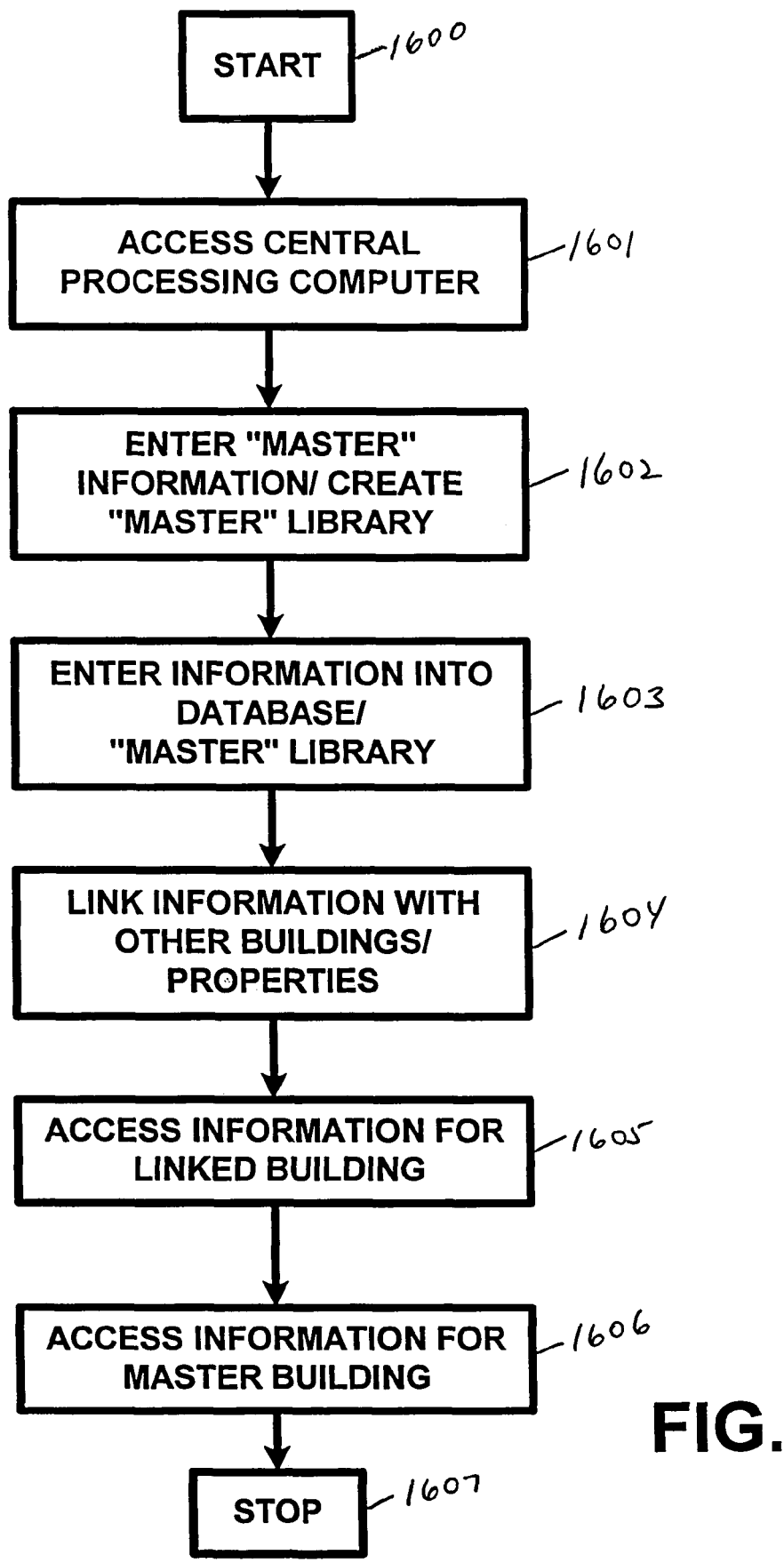
FIG. 17 illustrates a flow diagram of yet another preferred embodiment method for utilizing the present invention.

In another preferred embodiment, the apparatus and method of the present invention can be utilized in order to enable building or property owners or managers to create and maintain a master library of documents, information, maintenance request responses, and/or any of the other herein-described information, for any number and/or types of buildings and/or properties. The master library can be stored and maintained by the apparatus 1, and/or by the central processing computer 10, and can be accessed via individuals located at, and/or associated with, any of the buildings or properties described herein. In this manner, any of the documents, information, requests and/or responses thereto, can be entered for any and/or all of the buildings or properties, individually or as a group. This dispenses with the need for entering these documents, information, requests and/or responses thereto, for each individual building or property. FIG. 17 illustrates another preferred embodiment for utilizing the apparatus and method of the present invention.

With reference to FIG. 17, the operation of the apparatus 1 commences at step 1600. At step 1601, the individual accesses the central processing computer 10. At step 1602, the individual can enter information for a new building or property which can herein be defined as a "master building" or "master property" so as to thereby create a "master library" for the building or property. At step 1603, the individual can enter documents, information, maintenance requests and/or responses thereto, into the database or master library for the master building or master property.

At step 1604, the individual can link the information, documents, requests and/or responses thereto, for the master building with any other buildings or properties under the individual's management. In this manner, the information, documents, requests and/or responses thereto, can be shared between the buildings or properties and/or with the individuals associated therewith. The information, documents, requests and/or responses thereto, for the buildings or properties can be linked via any appropriate linking means, such as, for example, by inserting an appropriate code, identifier, or linking code, or hyperlink.

At step 1605, a user associated with a building or property which is linked to the master building or master property can access the central processing computer 10 and access the information, documents, requests and/or responses thereto, for the linked building. Thereafter, at step 1606, the user can access and receive any of the information, documents, requests and/or responses thereto, which are stored in the library associated with the master building or master property. The information, documents, and/or responses, can thereafter be utilized in any appropriate manner. Thereafter, the operation of the apparatus 1 will cease at 1607.

In any and/or all of the embodiments described herein, the central processing computer 10, the user computer(s) 20, and/or any of the other computers performing any of the herein described processing and/or processing functionality, can generate and transmit e-mail messages, pager messages, telephone messages, voice mail messages, facsimile messages or transmissions, and/or any other messages and/or types of messages, upon the posting of any of the herein-described information, questions, surveys, current events, notices, news reports or notices, requests, and/or any other data and/or information described herein as being received by and/or processed by the apparatus 1 of the present invention.

In any and/or all of the embodiments described herein, the various user screens, interfaces, web pages, and/or other information sources, can be custom tailored for their particular purposes and/or for the particular functionality. Any and/or all of the respective screens, interfaces, web pages, and/or other information sources, can also have help screens associated therewith for assisting the respective users in the utilization of the present invention.

While the present invention has been described and illustrated in various preferred embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

What is claimed is:

1. A collaborative real estate management system for exchanging information among tenants and an individual associated with management of a building, the system comprising:
   a computer system in communication with data input and output devices accessible by said tenants and said individual associated with management of said building;

said computer system including one or more processors networked together and programmed to process data relating to management of said building;

said one or more processors being further programmed I) to receive a communication relating to management of said building from a device associated with at least one of said tenants, said communication including data indicating an instruction being associated with a task performed by said individual, said individual being associated with a front desk of said building, a front gate of said building, or a combination thereof, ii) to associate said instruction with said at least one of said tenants using an identifier, iii) to store said instruction and said identifier on said computer system, and iv) to enable said individual to search said computer system to obtain said instruction using a computing device associated with said individual;

said computer system including a database, said database including a library of documents relating to said building which documents are accessible for viewing, storing, and editing by said tenants, a staff member, a building manager, or any combination thereof;

wherein said computer system enables interaction by said tenants with said individual through said system.

2. A method comprising:

receiving an instruction via a computing device associated with a tenant associated with a building, said instruction being associated with a task performed by an individual associated with a front desk of said building, a front gate of said building, or a combination thereof;

wherein said instruction is associated with permissions to give access to a unit associated with said tenant, keyholding information, or any combination thereof;

associating said instruction with said tenant using an identifier;

storing said instruction and said identifier on a central computer; and enabling said individual to search said central computer to obtain said instruction using a computing device associated with said individual.

3. A method comprising:

receiving an instruction via a computing device associated with a tenant associated with a building, said instruction being associated with a task performed by an individual associated with a front desk of said building, a front gate of said building, or a combination thereof;

designating said instruction as being inactive upon expiration of a specified time period;

associating said instruction with said tenant using an identifier;

storing said instruction and said identifier on a central computer; and enabling said individual to search said central computer to obtain said instruction using a computing device associated with said individual.

4. A method comprising:

receiving an instruction via a computing device associated with a tenant associated with a building, said instruction being associated with a task performed by an individual associated with a front desk of said building, a front gate of said building, or a combination thereof;

associating said instruction with said tenant using an identifier;

storing said instruction and said identifier on a central computer;

transmitting data representing said first instruction, a portion of said first instruction, said identifier, or any combination thereof to a public display; and enabling said individual to search said central computer to obtain said instruction using a computing device associated with said individual.

5. The method of claim 4 wherein said public display comprises a display in an entranceway associated with said building, an elevator associated with said building, another public area associated with said building, or any combination thereof.

6. A method comprising:

receiving an instruction via a computing device associated with a tenant associated with a building, said instruction being associated with a task performed by an individual associated with a front desk of said building, a front gate of said building, or a combination thereof;

associating said instruction with said tenant using an identifier;

storing said instruction and said identifier on a central computer;

displaying said first instruction, a portion of said first instruction, said identifier, or any combination thereof to a public display; and enabling said individual to search said central computer to obtain said instruction using a computing device associated with said individual.

7. A method comprising:

receiving an instruction via a computing device associated with a tenant associated with a building, said instruction being associated with a task performed by an individual associated with a front desk of said building, a front gate of said building, or a combination thereof;

associating said instruction with said tenant using an identifier;

storing said instruction and said identifier on a central computer; and enabling said individual to search said central computer to obtain said instruction using a computing device associated with said individual;

wherein said building is a first building, the method further comprising providing aggregated data for said first building and a second building.

8. A method comprising:

receiving an instruction via a computing device associated with a tenant associated with a building, said instruction being associated with a task performed by an individual associated with a front desk of said building, a front gate of said building, or a combination thereof;

wherein said tenant is a first tenant and said individual is a first individual;

associating said instruction with said tenant using an identifier;

storing said instruction and said identifier on a central computer;

enabling said individual to search said central computer to obtain said instruction using a computing device associated with said individual;

receiving a request for service via a computing device associated with a second tenant associated with said building;

storing said request for service on said central computer; and enabling a second individual to search said central computer to obtain said request for service using a computing device.

9. The method of claim 8 wherein said first individual is identical to said second individual.

10. The method of claim 8 wherein said building is a first building, the method further comprising providing aggregated data for said first and second buildings, said data comprising said request for service and another request for service associated with said second building.

11. The method of claim 8 wherein said request for service comprises a title, a category selected from a list, a request description, an urgency rating, an email address, a contact information, an instruction for an additional parties, or any combination thereof.

12. The method of claim 8 further comprising enabling a user, using a computing device, to search said central computer to obtain a list of search results including said request for service.

13. The method of claim 12 further comprising enabling said user to sort said list of search results by unit number, request category, date opened, priority, status, or any combination thereof.

14. The method of claim 8 further comprising enabling a user associated with building management to modify said request for service.

15. The method of claim 14 wherein modifying said request for service comprises changing a category of said request, assigning a priority to said request, opening said request, closing said request, placing said request on hold until a certain date, recording an amount of time spent on a task related to said request, entering a dollar amount of costs which can be charged to said second tenant associated with said request, posting a comment to said request log, or any combination thereof.

16. The method of claim 8 further comprising transmitting a notification in response to said request for service.

17. The method of claim 16 wherein transmitting comprises transmitting an email message, a beeper message, a pager message, a fax transmission, or any combination thereof.

18. A method comprising:
receiving an instruction via a computing device associated with a tenant associated with a building, said instruction being associated with a task performed by an individual associated with a front desk of said building, a front gate of said building, or a combination thereof;
associating said instruction with said tenant using an identifier;
storing said instruction and said identifier on a central computer;
enabling said individual to search said central computer to obtain said instruction using a computing device associated with said individual; and
providing an electronic library including one or more electronic documents.

19. The method of claim 18 wherein providing further comprises associating an electronic document in said electronic library with an expiration date.

20. The method of claim 18 wherein providing further comprises associating permissions with an electronic document in said electronic library, said permissions defining which users can access, view, update, or any combination thereof, said electronic document.

21. The method of claim 18 wherein providing further comprises associating permissions with an electronic document in said electronic library, said permissions defining a particular group of users who can access, view, update, or any combination thereof, said electronic document.

22. The method of claim 21 wherein said particular group of users comprises board members.

23. The method of claim 18 further comprising transmitting a notification in response to an electronic document.

24. The method of claim 23 wherein transmitting comprises transmitting an email message, a beeper message, a pager message, a fax transmission, or any combination thereof.

25. The method of claim 23 wherein transmitting comprises transmitting said notification in response to said electronic document being added to said electronic library.

26. The method of claim 23 wherein transmitting comprises transmitting said notification in response to said electronic document being updated.

27. The method of claim 18 further comprising enabling a user to search said electronic library using a keyword.

28. The method of claim 18 wherein said building is a first building further comprising allowing access to said electronic library by users associated with said first building and users associated with a second building.

29. A method comprising:
receiving an instruction via a computing device associated with a tenant associated with a building, said instruction being associated with a task performed by an individual associated with a front desk of said building, a front gate of said building, or a combination thereof;
wherein said tenant is a first tenant and said individual is a first individual;
associating said instruction with said tenant using an identifier;
storing said instruction and said identifier on a central computer;
enabling said individual to search said central computer to obtain said instruction using a computing device associated with said individual;
receiving a request for service via a computing device associated with a second tenant associated with said building;
storing said request for service on said central computer;
enabling a second individual to search said central computer to obtain said request for service using a computing device; and
providing an electronic library including one or more electronic documents.

30. The method of claim 29 wherein said building is a first building further comprising providing aggregated data for said first and second buildings.

31. The method of claim 29 wherein said request for service comprises a title, a category selected from a list, a request description, an urgency rating, an email address, a contact information, instructions for additional parties, or any combination thereof.

32. The method of claim 31 wherein said instruction is associated with package delivery, laundry delivery, or any combination thereof.

33. The method of claim 31 further comprising transmitting data representing said first instruction, a portion of said first instruction, said identifier, or any combination thereof to a public display.

34. The method of claim 33 wherein said public display comprises a display in an entranceway associated with said building, an elevator associated with said building, another public area associated with said building, or any combination thereof.

35. The method of claim 31 further comprising receiving biometric data.

36. The method of claim 35 further comprising comparing said received biometric data with biometric data stored on said central computer.

37. The method of claim 29 further comprising transmitting a notification.

38. The method of claim 37 wherein transmitting comprises transmitting an email message, a beeper message, a pager message, a fax transmission, or any combination thereof.

39. The method of claim 29 wherein providing further comprises associating permissions with an electronic document in said electronic library, said permissions defining which users can access, view, update, or any combination thereof, said electronic document.

40. The method of claim 29 further comprising transmitting a notification in response to an electronic document being added to said electronic library.

41. The method of claim 29 further comprising permitting access to information stored on said central computer based on a type of user.

* * * * *

UNITED STATES PATENT AND TRADEMARK OFFICE
CERTIFICATE OF CORRECTION

| | | |
|---|---|---|
| PATENT NO. | : 8,271,321 B1 | Page 1 of 1 |
| APPLICATION NO. | : 09/587525 | |
| DATED | : September 18, 2012 | |
| INVENTOR(S) | : Gerald Isaac Kestenbaum | |

It is certified that error appears in the above-identified patent and that said Letters Patent is hereby corrected as shown below:

In the Specification:

Col. 1, line 4 should include the following additional paragraph in the first sentence immediately following the title:

"CROSS-REFERENCE TO RELATED APPLICATIONS

This application claims priority from provisional U.S. application no. 60/185,022, filed February 25, 2000, which is herein incorporated by reference in its entirety."

Signed and Sealed this
Second Day of July, 2013

Teresa Stanek Rea
*Acting Director of the United States Patent and Trademark Office*